United States Patent
Anderson et al.

(10) Patent No.: US 10,074,205 B2
(45) Date of Patent: Sep. 11, 2018

(54) MACHINE CREATION OF PROGRAM WITH FRAME ANALYSIS METHOD AND APPARATUS

(71) Applicant: Intel Corporation, Santa Clara, CA (US)

(72) Inventors: Glen J. Anderson, Beaverton, OR (US); David I. Poisner, Carmichael, CA (US); Ravishankar Iyer, Portland, OR (US); Mark Francis, Portland, OR (US); Michael E. Kounavis, Portland, OR (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 15/252,126

(22) Filed: Aug. 30, 2016

(65) Prior Publication Data

US 2018/0061107 A1   Mar. 1, 2018

(51) Int. Cl.

| | |
|---|---|
| *G06T 13/00* | (2011.01) |
| *G06T 13/20* | (2011.01) |
| *G06T 7/00* | (2017.01) |
| *A63F 13/52* | (2014.01) |
| *A63F 13/60* | (2014.01) |

(52) U.S. Cl.
CPC .............. *G06T 13/20* (2013.01); *A63F 13/52* (2014.09); *A63F 13/60* (2014.09); *G06T 7/0022* (2013.01); *G06T 7/0046* (2013.01); *G06T 2207/10016* (2013.01); *G06T 2213/08* (2013.01)

(58) Field of Classification Search
None
See application file for complete search history.

(56) References Cited

U.S. PATENT DOCUMENTS

| | | |
|---|---|---|
| 6,741,245 B1 | 5/2004 | Marks et al. |
| 6,939,192 B1 | 9/2005 | Munch et al. |
| 8,754,886 B2 | 6/2014 | Wouhaybi et al. |
| 9,292,085 B2 | 3/2016 | Bennett et al. |
| 2002/0196250 A1 | 12/2002 | Anderson et al. |

(Continued)

FOREIGN PATENT DOCUMENTS

| | | |
|---|---|---|
| WO | WO2013023705 A1 | 2/2013 |
| WO | WO2014018227 A1 | 1/2014 |
| WO | WO2016093965 A1 | 6/2016 |
| WO | WO2016093982 A1 | 6/2016 |

OTHER PUBLICATIONS

Barnes, Connelly, et al. "Video puppetry: a performative interface for cutout animation." ACM Transactions on Graphics (TOG). vol. 27. No. 5. ACM, 2008.*

(Continued)

*Primary Examiner* — Ryan M Gray
(74) *Attorney, Agent, or Firm* — Schwabe, Williamson & Wyatt, P.C.

(57) ABSTRACT

Methods, apparatus, and systems to create, output, and use animation programs comprising keyframes, objects, object states, and programming elements. Objects, object states, and programming elements may be created through image analysis of image input. Animation programs may be output as videos, as non-linear interactive experiences, and/or may be used to control electronic actuators in articulated armatures.

25 Claims, 10 Drawing Sheets

(56) References Cited

U.S. PATENT DOCUMENTS

| | | | |
|---|---|---|---|
| 2003/0190143 A1 | 10/2003 | Girgensohn | |
| 2005/0026537 A1 | 2/2005 | Hsieh et al. | |
| 2006/0077263 A1 | 4/2006 | Hosoda | |
| 2007/0063997 A1 | 3/2007 | Scherer et al. | |
| 2007/0242086 A1 | 10/2007 | Tsujimoto et al. | |
| 2009/0109240 A1 | 4/2009 | Englert et al. | |
| 2009/0259994 A1 | 10/2009 | Kennedy, Jr. | |
| 2010/0220891 A1* | 9/2010 | Lefevre | G06T 7/20 |
| | | | 382/103 |
| 2011/0080424 A1 | 4/2011 | Peters | |
| 2011/0169914 A1* | 7/2011 | Lowe | G06T 15/20 |
| | | | 348/43 |
| 2011/0235905 A1 | 9/2011 | Yokokawa | |
| 2011/0298922 A1 | 12/2011 | Horovitz et al. | |
| 2012/0249741 A1 | 10/2012 | Maciocci et al. | |
| 2012/0263154 A1 | 10/2012 | Blanchflower et al. | |
| 2012/0327119 A1 | 12/2012 | Woo et al. | |
| 2013/0169626 A1 | 7/2013 | Balan et al. | |
| 2013/0182858 A1 | 7/2013 | You et al. | |
| 2013/0249944 A1 | 9/2013 | Raghoebardayal | |
| 2013/0265333 A1 | 10/2013 | Ainsworth et al. | |
| 2013/0278607 A1* | 10/2013 | Twigg | G06T 13/80 |
| | | | 345/473 |
| 2013/0288563 A1 | 10/2013 | Zheng et al. | |
| 2013/0290944 A1 | 10/2013 | Menon et al. | |
| 2013/0307875 A1 | 11/2013 | Anderson | |
| 2013/0342671 A1 | 12/2013 | Hummel | |
| 2014/0026051 A1 | 1/2014 | Roh | |
| 2014/0129990 A1 | 5/2014 | Xin et al. | |
| 2014/0132758 A1 | 5/2014 | Saptharishi | |
| 2014/0188669 A1 | 7/2014 | Freeman et al. | |
| 2014/0211991 A1 | 7/2014 | Stoppa | |
| 2014/0232749 A1 | 8/2014 | Park et al. | |
| 2014/0344762 A1 | 11/2014 | Grasset et al. | |
| 2014/0378022 A1 | 12/2014 | Muthyala et al. | |
| 2015/0042795 A1 | 2/2015 | Tsuria | |
| 2016/0063750 A1* | 3/2016 | Bhargava | G06T 13/20 |
| | | | 345/473 |
| 2016/0171739 A1 | 6/2016 | Anderson et al. | |
| 2016/0171767 A1 | 6/2016 | Anderson | |
| 2016/0180571 A1 | 6/2016 | Anderson et al. | |
| 2016/0184724 A1 | 6/2016 | Butler et al. | |
| 2017/0091346 A1 | 3/2017 | Anderson et al. | |

OTHER PUBLICATIONS

Glauser O, Ma WC, Panozzo D, Jacobson A, Hilliges O, Sorkine-Hornung O. Rig animation with a tangible and modular input device. ACM Transactions on Graphics (TOG). Jul. 11, 2016;35(4):144.*

Han, Xiaoguang, et al. "A Video-Based System for Hand-Driven Stop-Motion Animation." IEEE computer graphics and applications 33.6 (2013): 70-81.*

Held, R., Gupta, A., Curless, B., & Agrawala, M. (Oct. 2012). 3D puppetry: a kinect-based interface for 3D animation. In UIST (pp. 423-434).*

Slyper, Ronit, Guy Hoffman, and Ariel Shamir. "Mirror Puppeteering: Animating Toy Robots in Front of a Webcam." Proceedings of the Ninth International Conference on Tangible, Embedded, and Embodied Interaction. ACM, 2015.*

Final Office Action dated Oct. 18, 2017 for U.S. Appl. No. 15/070,988 67 pages.

Office Action dated Apr. 26, 2017 for U.S. Appl. No. 15/070,988 67 pages.

Office Action dated Apr. 4, 2017 for U.S. Appl. No. 14/567,117, 20 pages.

Glen J. Anderson et al., "Technologies for Physical Programming", International Application No. PCT/US2016/048948, filed Aug. 26, 2016, 36 pages.

International Search Report and Written Opinion dated Dec. 7, 2016 for International Application No. PCT/US2016/048948, 14 pages.

Glen J. Anderson et al., "Technologies for Physical Programming", U.S. Appl. No. 14/866,897, filed Sep. 26, 2015, 41 pages.

International Search Report and Written Opinion dated Feb. 17, 2016 for International Application No. PCT/US2015/058840, 12 pages.

Office Action dated May 26, 2016 for U.S. Appl. No. 14/575,742, 31 pages.

Final Office Action dated Oct. 26, 2016 for U.S. Appl. No. 14/575,742, 29 pages.

Office Action dated Mar. 1, 2017 for U.S. Appl. No. 14/575,742, 33 pages.

Office Action dated Apr. 8, 2016 for U.S. Appl. No. 14/567,117, 29 pages.

Final Office Action dated Apr. 8, 2016 for U.S. Appl. No. 14/567,117, 18 pages.

International Search Report and Written Opinion dated Feb. 24, 2016 for International Application No. PCT/US2015/057335, 12 pages.

Glen J. Anderson et al., "Technologies for Physical Programming", U.S. Appl. No. 15/070,988, filed Mar. 15, 2016, 45 pages.

Final Office Action dated Aug. 3, 2017 for U.S. Appl. No. 14/575,742, 37 pages.

Office Action dated Aug. 1, 2017 for U.S. Appl. No. 14/567,712, 22 pages.

Final Office Action dated Nov. 24, 2017 for U.S. Appl. No. 14/567,712, 22 pages.

Office Action dated Jan. 11, 2018 for U.S. Appl. No. 14/567,117, 31 pages.

Office Action dated Mar. 28, 2018 for U.S. Appl. No. 15/070,988, 13 pages.

* cited by examiner

MACHINE CREATION OF PROGRAM WITH FRAME ANALYSIS METHOD AND APPARATUS

FIELD

The present disclosure relates to the field of computing, in particular to, a system to machine create a software program from one or more captured images.

BACKGROUND

Stop-motion animation is an animation technique in which a physical object is photographed, manipulated or moved in a small increment, photographed, moved, photographed, etc., creating the illusion of movement when the photographs, also referred to as "frames", are rendered in a continuous sequence.

Stop motion animation is sometimes described in terms of model animation, puppet animation and object animation, to describe the use of models and puppets designed to look like a recognizable human or animal character and objects not designed to look like a recognizable human or animal character. Clay models, build-up models, casted models, puppets, and objects may contain skeletons, joints, and/or armatures (armatures are internal structures, often used for support). In the context of video and stop-motion animation creation, armatures may be articulated and may be electronically controlled, so that a device can be moved in steps or continuously, to shoot stop motion animation frames or live-action video.

Within video games, a "sandbox game" or "open world game", such as Minecraft™ allows users to assemble units into digital structures, creating a world. Assembly of units can be performed through a graphical user interface or through text-based programming languages, such as javascript, with varying levels of complexity.

Figure 1:
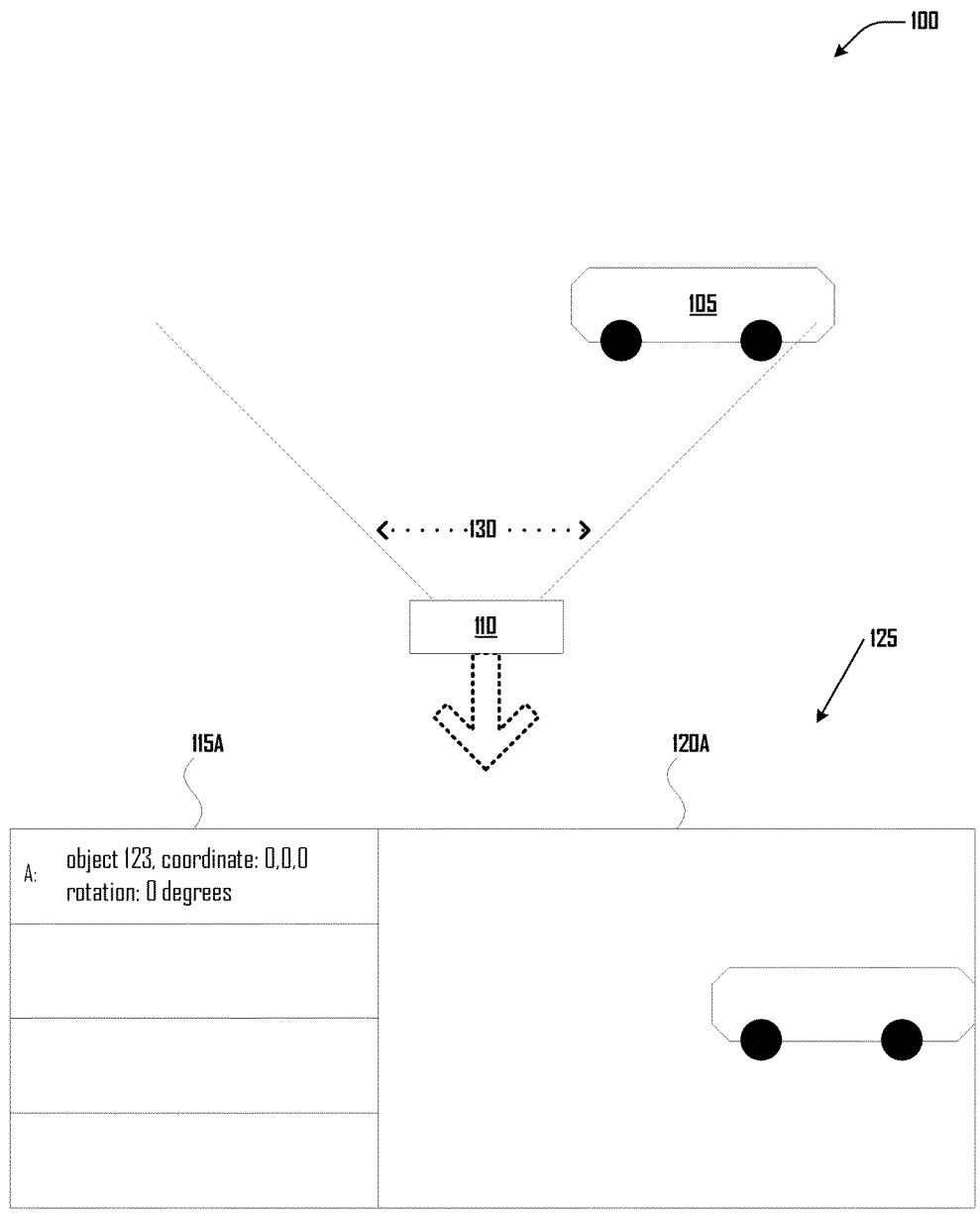
FIG. 1 is a functional block diagram illustrating an example of a camera and a computer device incorporated with teachings of the present disclosure and imaging an object in a first position and preparing a first keyframe for machine creation of a program, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, stop motion is an animation technique in which a physical object is photographed, manipulated or moved, and photographed again. When viewed in a continuous sequence, the resulting photographs or images create an illusion of movement.

As used herein, inbetweening or tweening is a process of generating intermediate frames between a first and second image to give the appearance that the first image evolves into the second image. Inbetweening techniques include manually illustrating intermediate frames and using computer software and hardware to interpolate transitional frames and using computer software and hardware to perform computer animation to generate transitional frames.

As used herein, interpolate, interpolation, or key frame animation is a process in which a set of key points are identified. The key points may be in two or more image frames, in two or more 2- or 3-dimensional ("2D" or "3D") coordinate systems, or the like. Interpolation forms a curve through or near these key points. Interpolation can be used to create a "morphing" effect, which transforms one image into another, as well as to create the illusion of motion.

As used herein, computer animation or "cgi animation" is a process of generating static images or dynamic scenes (series of images), generally using 2D or 3D virtual skeletons, digital armatures, or interpolation.

As used herein, a digital armature is a kinematic chain which simulates the allowed range of motion of a digital object, including a digital object which comprises rigid body subcomponents. A rigid body subcomponent of a digital armature is typically defined as a non-deformable body which potentially has one or more degrees of freedom, either relative to another body or relative to a ground frame. Rigid bodies can be connected in kinematic chains with kinematic constraints between the rigid bodies. Forward analysis of kinematic chains may be used to solve how a digital armature may move in response to movement of one or more rigid bodies in the kinematic chain. Kinematic synthesis is the use of constraint equations of a kinematic chain to determine the dimensions of linkages of rigid bodies based on a specification of movement.

As used herein, an articulated armature is a kinematic chain which includes joints which restrains or defines the allowed range of motion of an object comprising subcomponents. Articulated armatures may comprise motors (electronic other otherwise) or actuators to control the movement of a device which incorporates the articulated armature and appropriate computational and/or communications technologies to allow control or operation (including remote control or operation) of the device incorporating the articulated armature. Control of an articulated armature in a physical device may be performed via control of a corresponding digital armature.

As used herein, a kinematic chain is an assembly of rigid bodies connected by joints which form a mathematical model for a mechanical system.

As used herein, photogrammetry is an analytic process of applying optics and projective geometry to measure physical objects through photography and 2D and 3D motion fields. Algorithms for photogrammetry typically attempt to minimize the sum of the squares of errors over the coordinates and relative displacement of reference points, also known as bundle adjustment, often performed using the Levenberg-Marquardt algorithm or the like. Performance of photogrammetry typically requires image coordinates (the location of points in an image) as well as the exterior orientation (location in space and view direction) of the camera as well as its inner orientation (geometric parameters of the imaging process, such as focal length and lens distortion). Range data may be used to obtain greater accuracy in the z direction (in an x, y, and z coordinate system). Range data may be obtained from LiDAR, laser scanners (using time of flight, triangulation or interferometry), structured light projection, white-light digitizers, range imaging, and the like.

As used herein, a process corresponds to an instance of an application executing on a processor and a thread corresponds to a portion of the process. A processor may include one or more execution core(s). The processor may be configured as one or more socket(s) that may each include one or more execution core(s).

As used herein, the term "module" (or "logic") may refer to, be part of, or include an Application Specific Integrated Circuit (ASIC), a System on a Chip (SoC), an electronic circuit, a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

In overview, this disclosure relates to methods and systems in a computing device apparatus to analyze one or more images and other program time input to determine an animation program comprising one or more keyframes. Keyframes comprise an object, such as an object determined to be in the image(s), object state(s), and programming element(s). An animation program may be output as a video, as an interactive experience (aka, game), and/or may be used to control and augment a real device.

Objects may be identified based on a correspondence between an image or another identifier and an object in an existing palette of objects; alternatively and/or in addition, objects may be determined based on photogrammetry of real-world objects in the images. An object may be associated with a 2D or 3D model, a digital armature, and an articulated armature in a physical device. An object may comprise a set of solid bodies in a kinematic chain.

Object states may comprise, for example, a rotation of an object or a rigid body therein (including yaw, pitch, and roll), a translation of an object or a rigid body therein, a sound effect, or graphical effect, and/or a lighting effect. When describing rotation or translation, object states may be described relative to another object and object state, a frame of the image, or a coordinate in a coordinate space; for example, an object state for an object in an image may be described relative to another image of the object in another image or frame and/or may be described relative to the object in a coordinate space, which may be unrelated to the object in another image or frame. Object states may be organized as primitives and macros. Primitives may comprise units, such as units of rotation, such as 5 degrees of yaw, units of translation, such as 20 pixels or 20' of translation or the like, and units of sound, graphical, and/or lighting effects. Macros may comprise sets of primitives. Pre-made primitives and macros may accompany a set of objects, such as a set of object associated with a set of physical construction toys. A program time input to object state map facilitates animation program creation by mapping program time input to object states, such that a whistle recorded during program time is interpreted as a "squealing tire" object state or than an upside-down car is interpreted as an explosion of the car.

Analyzed images, object(s), and object state(s) may be made into keyframes. The objects and object states in keyframes can be assembled into an animation program.

Animation programs comprise objects, object states and program elements. Program elements determine how object states respond to input or, if no input is received, how one object/object state in one keyframe leads to another keyframe. Program elements may comprise, for example, a command (such as a command to go to and/or transition from another keyframe) a conditional command, a function, a loop, a listen for run time user input, and a transition. A transition may comprise, for example, a fade, a blur, a swipe, a dissolve, a merge, a blend, an instruction to perform an inbetweening process, such as a kinematic transformation, an instruction to perform an interpolation, or an instruction to perform computer animation.

An animation program may be output as a video, as an interactive experience (aka, game), and/or may be used to control and augment a real device. When output as a video or as interactive experience, interpolation, digital armatures, kinematics and other techniques may be used to perform inbetweening to produce smooth motion video from the keyframes and the objects and object states therein. When output as an interactive experience or as control of a real device, the output may be modules responsive to run time user input. When output as control of a real device, the output may augment the real device with digital effects, such as sounds, graphical effects overlaid on video, and the like.

For example, a set of objects may be made for a set of construction toys, such as LEGO™ construction toys. When imaged, objects corresponding to the construction toys may be recognized; the objects may be associated with digital armatures and articulated armatures. When images of the construction toys are analyzed, object states for the images in the set may be determined and keyframes may be created comprising the objects, the object states, and programming instructions. A sequence of keyframes created during program time, such as a chronological sequence, may be accepted by the user or may be re-arranged. The user may insert other objects and other object states into existing keyframes or may create new keyframes with the same and/or new objects and object states. The sequence of keyframes may be fixed, as in a video, or may be dynamic, may depend on the receipt of run time user input, and may follow a logical sequence.

In this way, an animation author may create an animation program by starting with a relatively simple stop-motion animation, with a relatively simple set of objects, object states, and programming elements. As the animation author becomes familiar with the features of the animation creation module, the animation author can create more complex sequences of keyframes and programming elements. The resulting animation programs may be output as videos, as non-linear interactive experiences, and/or may be used to control electronic actuators in articulated armatures in the construction toys.

FIG. 1 is a functional block diagram illustrating tableau 100 comprising camera 110 in communication with computer device 125 incorporated with teachings of the present disclosure for machine creation of programs. In FIG. 1, camera 110 may have field of view 130 and take an image an object, car 105, in a first position. In FIG. 1, list 115A illustrates object state "A". As illustrated in FIG. 1, object state A may include identification of "object 123", corresponding to real-world car 105, identification that object 123 is at coordinates 0, 0, 0, and has no rotation. A keyframe may be formed comprising this object/object state relationship. The coordinates and rotation may be set at "zero" for this keyframe, for example, because it is a first keyframe, or, for example, relative to the image frame, or, for example, relative to another coordinate system or frame of reference (including a "real world" coordinate system or a coordinate system arbitrarily assigned to the real world). Block 120A may record a model, such as a 3D model, of object 123 in the detected object state, which generally may correspond to the then-current position and rotation of car 105, which may then later be used by a computer device to machine create a program for a user, as further described below.

Figure 2:
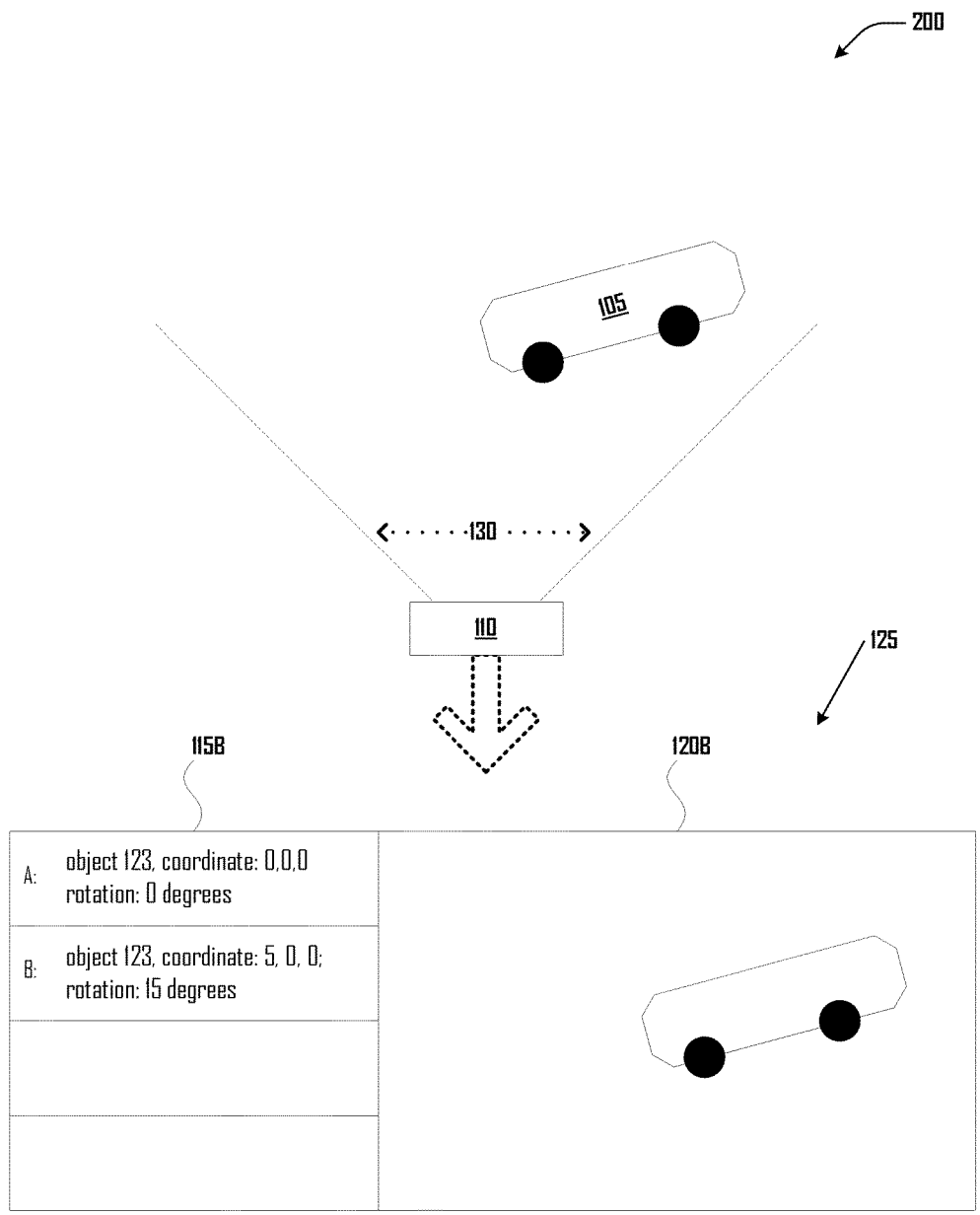
FIG. 2 is a functional block diagram illustrating an example of a camera and a computer device incorporated with teachings of the present disclosure and imaging an object in a second position and preparing a second keyframe for machine creation of a program, according to some embodiments.

FIG. 2 is a functional block diagram illustrating tableau 200 comprising camera 110 in communication with computer device 125 incorporated with teachings of the present disclosure for machine creation of programs. As in FIG. 1, camera 110 may have field of view 130 and take an image of an object, car 105, in a second position. In FIG. 2, list 115B may now also illustrate object state "B". As illustrated in FIG. 2, object state B may include identification of object 123, corresponding to real-world car 105, identification that object 123 is at coordinates 5, 0, 0, and has 15 degrees of rotation. The coordinates and rotation may be determined relative to another keyframe, such as the keyframe created in FIG. 1, and/or relative to the image frame, relative to another coordinate system or frame of reference. Determination of the relative coordinates and rotation in the keyframes may be according to a difference between the keyframes, such as according to photogrammetry techniques. Block 120B may record a model, such as a 3D model, of object 123 in the detected object state, which generally corresponds to the then-current position and rotation of car 105, which may then later be used by a computer device to machine create a program for a user, as further described below.

Figure 3:
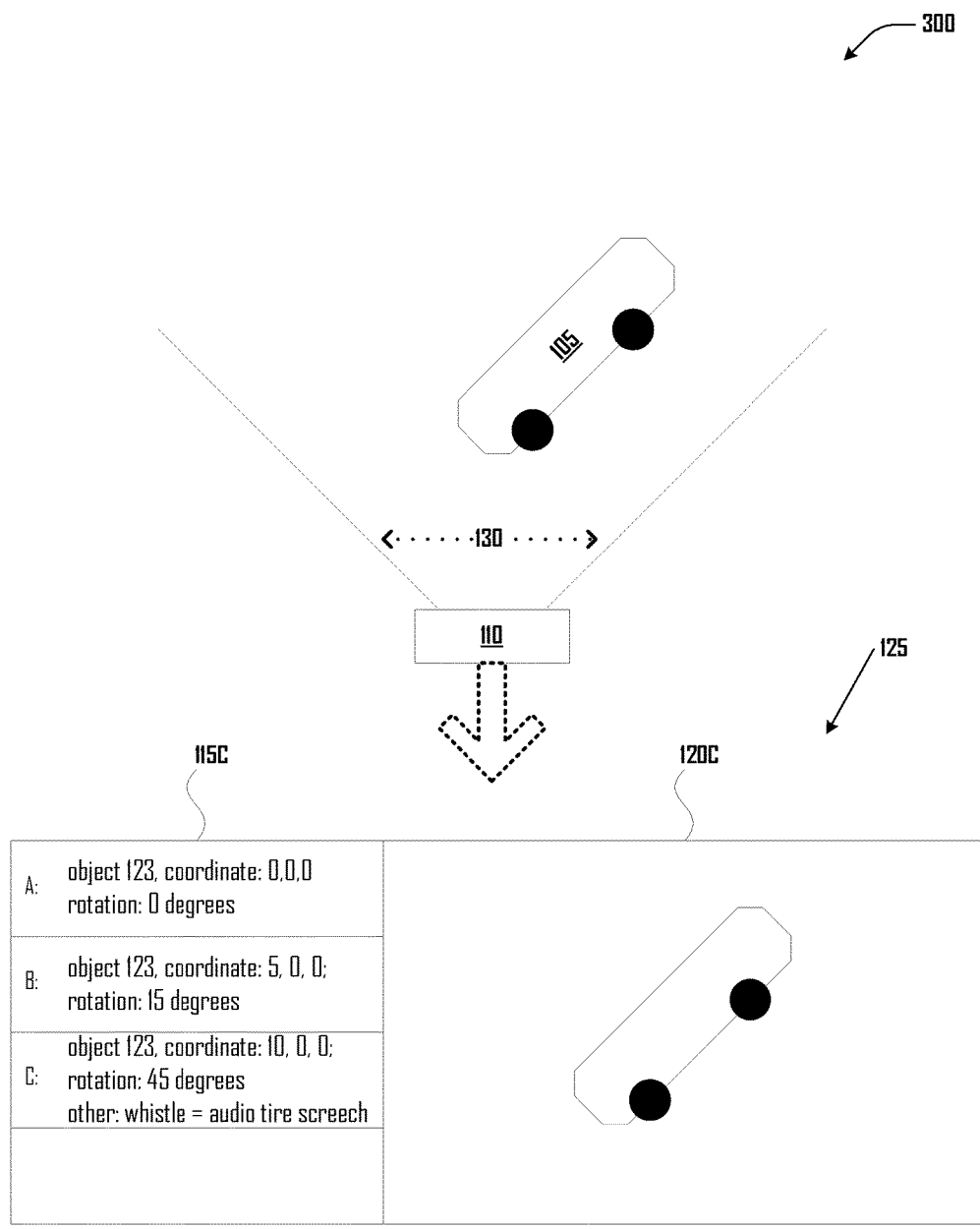
FIG. 3 is a functional block diagram illustrating an example of a camera and a computer device incorporated with teachings of the present disclosure and imaging an object in a third position and preparing a third keyframe for machine creation of a program, according to some embodiments.

FIG. 3 is a functional block diagram illustrating tableau 300 comprising camera 110 in communication with computer device 125 incorporated with teachings of the present disclosure for machine creation of programs. As in FIGS. 1 and 2, camera 110 may have field of view 130 and take an image of an object, car 105, in a third position. In FIG. 3, list 115C may now also illustrate object state "C". As illustrated in FIG. 3, object state C may include identification of object 123, corresponding to real-world car 105, identification that object 123 is at coordinates 10, 0, 0, and has 45 degrees of rotation. The coordinates and rotation may be determined relative to another keyframe, such as the keyframe created in FIG. 1, and/or relative to the image frame, relative to another coordinate system or frame of reference. Determination of the relative coordinates and rotation in the keyframes may be according to a difference between the keyframes, such as according to photogrammetry techniques. Object state C may also indicate "other: whistle=audio tire screech". This may indicate that a whistle was recorded or detected at the time image 120C was recorded (the time of recordation of the whistle does not have to be contemporaneous with recordation of the image). A program time input to object state map, which may be associated with a set of objects associated with car 105, may indicate that the detected whistle is to be associated with audio output of a screeching tire. Block 120C may record a model, such as a 3D model, of object 123 in the detected object state, which generally corresponds to the then-current position and rotation of car 105, which may then later be used by a computer device to machine create a program for a user, as further described below.

Figure 4:
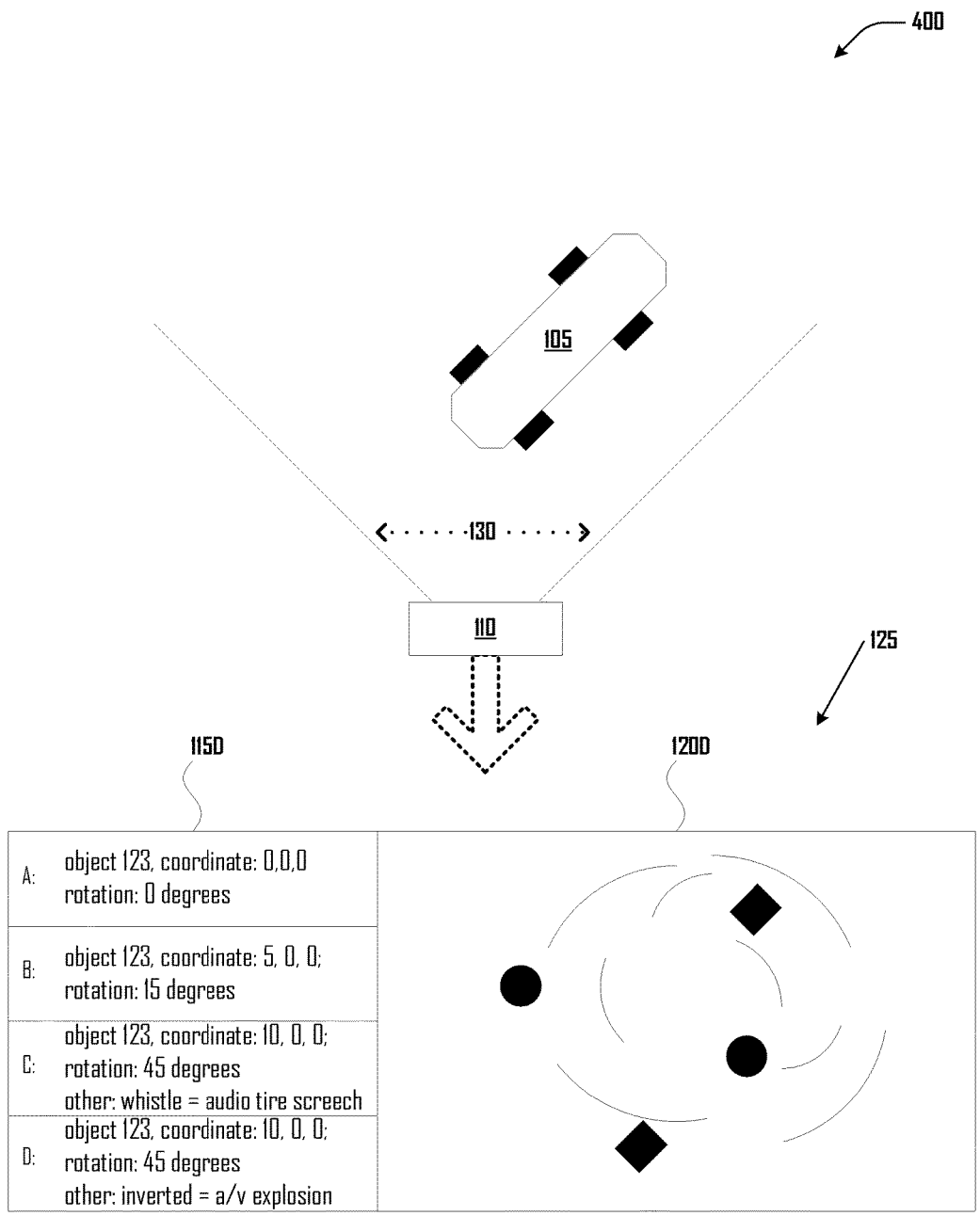
FIG. 4 is a functional block diagram illustrating an example of a camera and a computer device incorporated with teachings of the present disclosure and imaging an object in a fourth position and preparing a fourth keyframe for a machine creations of a program, according to some embodiments.

FIG. 4 is a functional block diagram illustrating tableau 400 comprising camera 110 in communication with computer device 125 incorporated with teachings of the present disclosure for machine creation of programs. As in FIGS. 1, 2, and 3, camera 110 may have field of view 130 and take an image of an object, car 105, in a fourth position. In FIG. 4, list 115D may now also illustrate object state "D". As illustrated in FIG. 3, object state D may include identification of object 123, corresponding to real-world car 105, identification that object 123 is at coordinates 10, 0, 0, has 45 degrees of rotation, and is inverted (is upside-down). The coordinates and rotation may be determined relative to another keyframe, such as the keyframe created in FIG. 1, and/or relative to the image frame, relative to another coordinate system or frame of reference. Determination of the relative coordinates and rotation in the keyframes may be according to a difference between the keyframes, such as according to photogrammetry techniques. Object state D may also indicate "other: inverted=a/v explosion". This may indicate that detection of the inverted position of car 105 is mapped, such as by program time input to object state map, to audio-visual output of object 123 exploding. Block 120D may record a model, such as a 3D model, of object 123 in the detected object state, which includes a graphical effect of car 105 exploding (simulated in FIG. 4), which may then later be used by a computer device to machine create a program for a user, as further described below.

The sequence of images in FIGS. 1-4 may be still-frame images or may be images selected from a video.

The keyframes created in FIGS. 1-4 may be used to machine create an animation program. The animation program may be output in the existing order (A-D) in a video or may be re-arranged. The output may perform inbetweening techniques to generate transitional images, such as interpolated images and/or computer animation images, between keyframes in a sequence of keyframes. The sequence of keyframes may be according to the order in which the images in FIGS. 1-4 were recorded, a re-arranged sequence, or according to a logical sequence, including a non-linear sequence, determined during a run time execution of a non-linear interaction and in response to run time user input, as may be set in programming elements.

Programming elements may be machine created for each of the keyframes. Programming elements may comprise, for example, a command to proceed to a next keyframe in a sequence, such as A to B to C to D, or a conditional command which may include an instruction to listen to user input and respond, conditionally, to the user input with one of several keyframes. For example, keyframe D may follow keyframe C if user input at keyframe C includes an "accelerate" command. Programming elements may comprise a transition, such as an instruction to perform inbetweening between two keyframes, such as to interpolate or insert computer animated images between two keyframes.

Figure 5:
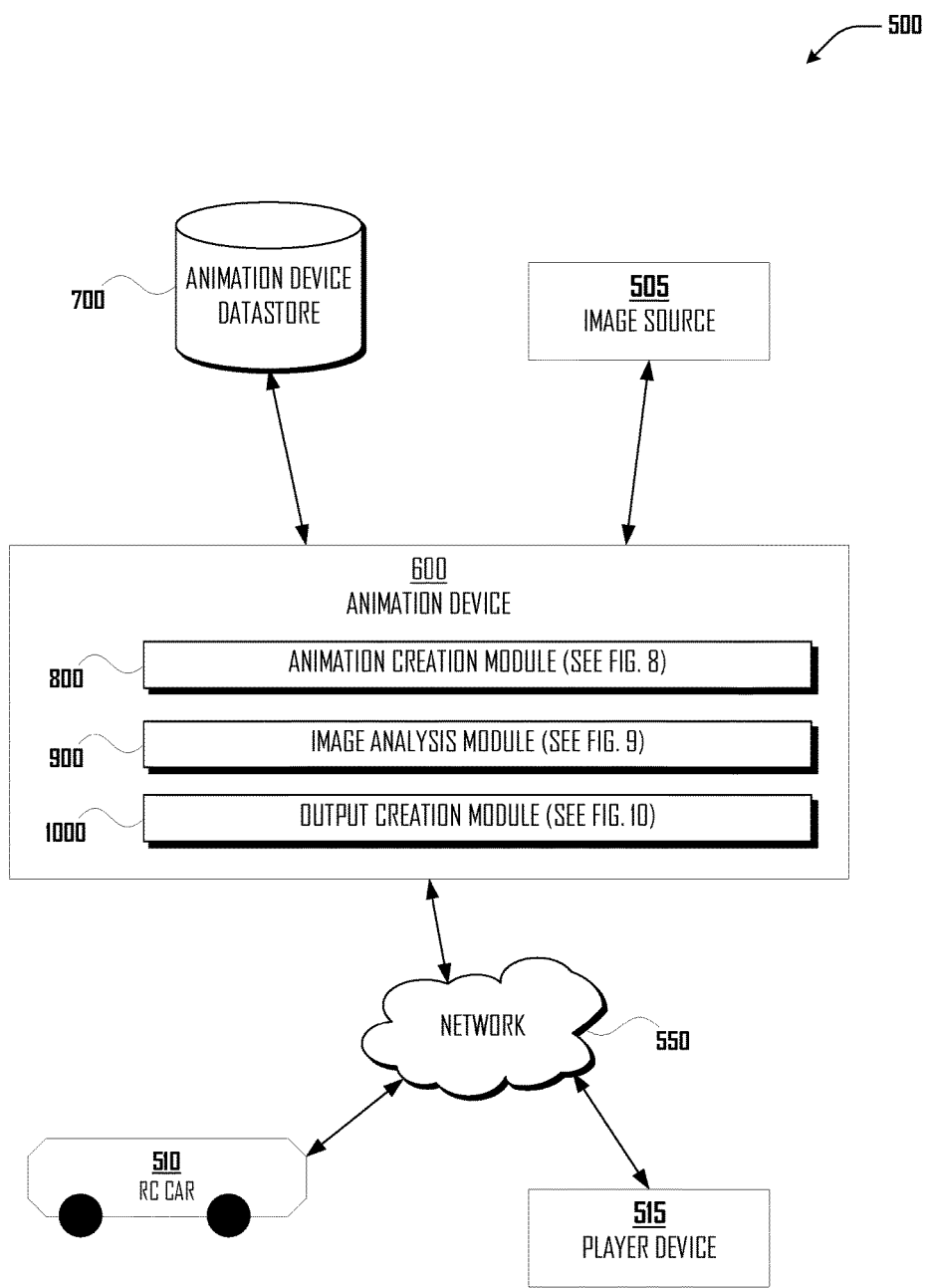
FIG. 5 is a network and device diagram illustrating an example of an animation device, an image source, a player device, and a radio controlled car in a network environment incorporated with teachings of the present disclosure, according to some embodiments.

FIG. 5 is a network and device diagram illustrating an example of animation device 600, image source 505, player device 515, and radio controlled car 510 interconnected by network 550 and incorporated with teachings of the present disclosure for machine creation of programs and execution of such program(s), according to some embodiments.

In embodiments, animation device 600 may include animation creation module 800, image analysis module 900, and output creation module 1000, of the present disclosure (described more fully below).

Animation device 600, except for the teachings of the present disclosure, may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer, a mobile telephone including, but not limited to a smart phone, (e.g., iPhone®, Android®-based phone, Blackberry®, Symbian®-based phone, Palm®-based phone, etc.) and/or a virtual reality display and supporting computers therefore.

Also illustrated in FIG. 5 is animation device datastore 700. Animation device datastore 700 is described further herein, though, generally, it may be understood as a datastore used by animation device 600.

Also illustrated in FIG. 5 is network 550. Network 550 may comprise computers, network connections among the computers, and software routines to enable communication between the computers over the network connections. Examples of Network 550 comprise an Ethernet network, the Internet, and/or a wireless network, such as Wi-Fi network or a GSM, TDMA, CDMA, EDGE, HSPA, LTE or other network provided by a wireless service provider. Connection to Network 550 may be via a Wi-Fi connection. More than one network may be involved in a communication session between the illustrated devices. Connection to Network 550 may require that the computers execute software routines which enable, for example, the seven layers of the OSI model of computer networking or equivalent in a wireless phone network.

Comparing the examples illustrated in FIGS. 1-4 to FIG. 5, computer device 125 may represent animation device 600 and animation device datastore 700, camera 110 may represent image source 505, and car 105 may represent radio controlled car 510. In place of or in addition to the examples discussed in relation to FIGS. 1-4, image source 505 may be a video camera, a still camera, and/or a camera or other device capable of providing range information or data, and/or a source of such images and information or data; radio controlled car 510 may be an object which is imaged by image source 505, such as car 105, and/or may be and/or may comprise an articulated armature which is controlled by, for example, animation device 600 and/or player device 515. As illustrated in FIG. 5, animation device 600 may comprise animation creation module 800, image analysis module 900, and output creation module 1000.

Figure 6:
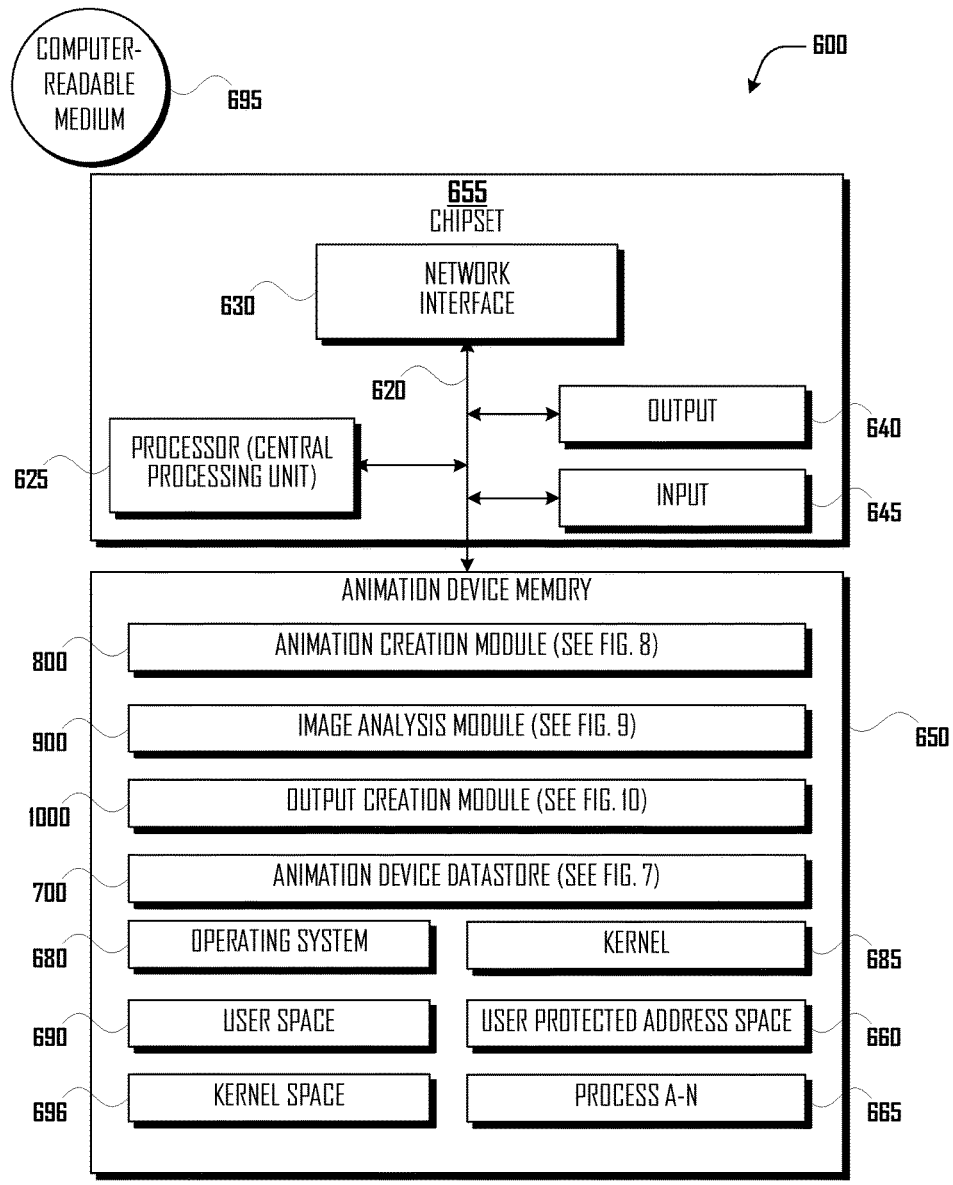
FIG. 6 is a functional block diagram illustrating an example of the animation device incorporated with teachings of the present disclosure, according to some embodiments.

FIG. 6 is a functional block diagram illustrating an example of animation device 600 incorporated with the teachings of the present disclosure for machine creation of programs, according to some embodiments. Animation device 600 may include chipset 655, comprising processor 625, input/output (I/O) port(s) and peripheral devices, such as output 640 and input 645, and network interface 630, and animation device memory 650, all interconnected via bus 620. Network Interface 630 may be utilized to form connections with Network 550, with animation device datastore 700, or to form device-to-device connections with other computers.

Chipset 655 may include communication components and/or paths, e.g., buses 620, that couple processor 625 to peripheral devices, such as, for example, output 640 and input 645, which may be connected via I/O ports. For example, chipset 655 may include a peripheral controller hub (PCH). In another example, chipset 655 may include a sensors hub. Input 645 and output 640 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 645 and output 640 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Animation device memory 650 may generally comprise a random access memory ("RAM"), a read only memory ("ROM"), and a permanent mass storage device, such as a disk drive or SDRAM (synchronous dynamic random-access memory). Animation device memory 650 may store program code for software modules or routines, such as, for example, transactional translation module 800 (illustrated and discussed further in relation to FIG. 8), image analysis module 900 (illustrated and discussed further in relation to FIG. 9), and output creation module 1000 (illustrated and discussed further in relation to FIG. 10).

Animation device memory 650 may also store operating system 680. These software components may be loaded from a non-transient computer readable storage medium 695 into animation device memory 650 using a drive mechanism associated with a non-transient computer readable storage medium 695, such as a floppy disc, tape, DVD/CD-ROM drive, memory card, or other like storage medium. In some embodiments, software components may also or instead be loaded via a mechanism other than a drive mechanism and computer readable storage medium 695 (e.g., via network interface 630).

Figure 7:
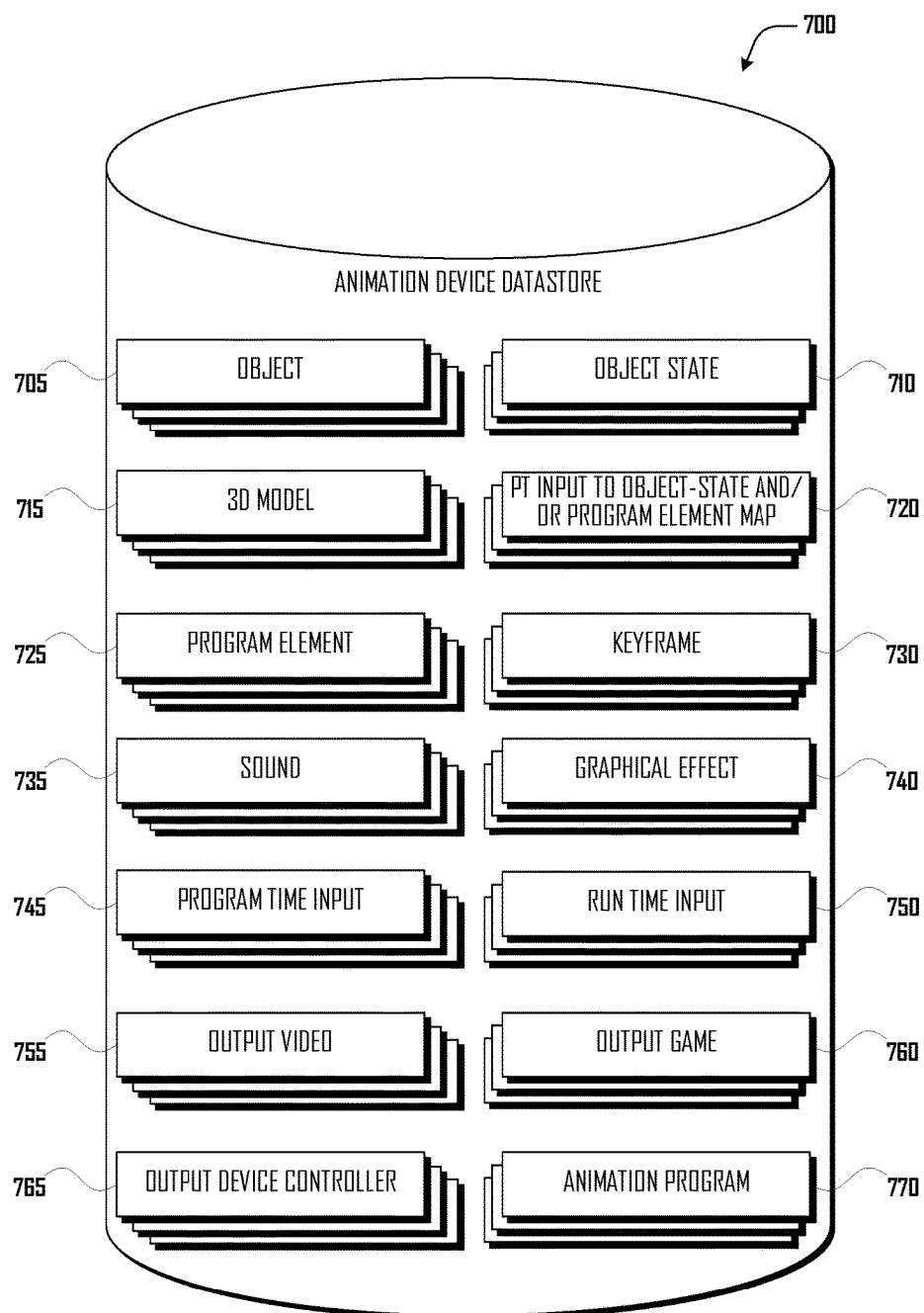
FIG. 7 is a functional block diagram illustrating an example of an animation device datastore for practicing the present disclosure, consistent with embodiments of the present disclosure.

Animation device memory 650 is also illustrated as comprising kernel 685, kernel space 696, user space 690, user protected address space 660, and animation device datastore 700 (illustrated and discussed further in relation to FIG. 7).

Animation device memory 650 may store one or more process 665 (i.e., executing software application(s)). Process 665 may be stored in user space 690. Process 665 may include one or more process 665A . . . 665N. One or more process 665 may execute generally in parallel, i.e., as a plurality of processes and/or a plurality of threads.

Animation device memory 650 is further illustrated as storing operating system 680 and/or kernel 685. The operating system 680 and/or kernel 685 may be stored in kernel space 696. In some embodiments, operating system 680 may include kernel 685. Operating system 680 and/or kernel 685 may attempt to protect kernel space 696 and prevent access by process 665A . . . 665N, unless authorized.

Kernel 685 may be configured to provide an interface between user processes and circuitry associated with animation device 600. In other words, kernel 685 may be configured to manage access to processor 625, chipset 655, I/O ports and peripheral devices by process 665. Kernel 685 may include one or more drivers configured to manage and/or communicate with elements of animation device 600 (i.e., processor 625, chipset 655, I/O ports and peripheral devices).

Animation device 600 may also comprise or communicate via Bus 620 with animation device datastore 700, illustrated and discussed further in relation to FIG. 7. In various embodiments, bus 620 may comprise a storage area network ("SAN"), a high speed serial bus, and/or via other suitable communication technology. In some embodiments, animation device 600 may communicate with animation device datastore 700 via network interface 630. Animation device 600 may, in some embodiments, include many more components than as illustrated. However, it is not necessary that all components be shown in order to disclose an illustrative embodiment.

FIG. 7 is a functional block diagram of the animation device datastore 700 illustrated in the animation device of FIG. 6, according to some embodiments. The components of animation device datastore 700 may include data groups used by modules and/or routines, e.g, object 705, object state 710, 3D model 715, program time input to object state and/or program element map 720, program element 725, keyframe 730, sound 735, graphical effect 740, program time input 745, run time input 750, output video 755, output game 760, output device control 765, and animation program 770 records. These are described more fully below; following are overviews of these records.

In overview, object 705 records may comprise an identifier of the object, a name of the object, a developer or source of the object, and the like. This information may be determined by correspondence between an image a palette of object 705 records or may be provided at program time by the author or creator of an animation program. Object 705 records may be associated with a 3-dimensional ("3D") model of a physical or virtual structure, including 3D model which includes or is associated with a digital armature), as may be recorded in one or more 3D model records. Object 705 records may be derived from, for example, construction blocks, toys, models, human bodies (including body parts, such as hands), animals, dolls, and the like.

In overview, object state 710 records may comprise a position and/or orientation of an object, such as in relation to object 705, which may be determined based on a degree of difference or similarity between a first image and a second image. Position or orientation may be determined relative to at least one of another object and object state, a frame of the image, or a coordinate in a coordinate space. Position and orientation may be with respect to components of an object, such as with respect to solid bodies in a kinematic relationship. Object state 710 records may further comprise a sound effect, a graphical effect, a lighting effect, or an image. Object state 710 records may further comprise an image, such as an image recorded during creation of an animation program (which image may be recorded in a program time input 745 record). Program time input may be mapped to object states and object state 710 records by one or more program time input to object state and/or program element map 720 records.

In overview, 3D model 715 records may comprise a digital armature describing kinematic relationship(s) among rigid bodies in an object. Digital armatures may describe articulated armatures in real-world objects, such as a digital armature which describes a hand, a car, or the like.

In overview, program time input to object state and/or program element map 720 records may map program time input to object states, such as object state 710 records, and/or to program elements, such as program element 725 records.

In overview, program element 725 records may comprise programming instructions, wherein the programming instructions may relate to an object 705, object state 710, and/or keyframe 730. For example, a program element 725 may comprise an instruction to transition an object in a first object state in a first keyframe to the first or a second object in a second object state in a second keyframe. The transition may comprise an inbetweening. Program element 725 may further comprise a command, a conditional command, a function, a loop, and a listen for a run-time user input.

In overview, keyframe 730 records may comprise one or more object 705 records, object state 710 records, and program element 725 records.

In overview, sound 735 records may comprise a sound effect and/or program time input audio, as may be recorded during imaging of a physical object.

In overview, graphical effect 740 records may comprise a graphical effect, such as, for example, smoke, fire, fog, skid marks, explosion, or the like.

In overview, program time input 745 records may comprise program time input received from an author (or another party) during creation of an animation program. Program time input may comprise, for example, an image (a digital photograph or sequence of photographs forming a video, including images of construction blocks, toys, models, hands, human bodies, animals, and the like), a sound, a configuration, position, or orientation of an object (which may be a relative or absolute orientation or position), a text input, a speech input, or the like.

In overview, run time input 750 records comprise a specification of a value or range of values for user or other input which may be received during run time of an animation program. The run time input may be input to a condition of a conditional command.

In overview, output video 755 records may comprise a video output from an animation program.

In overview, output game 760 records may comprise an executable interactive game or other interactive experience output from an animation program.

In overview, output device controller 765 records may comprise an executable actuator control, which may be responsive to run time input and which may control an actuator in a physical device.

In overview, animation program 770 records may comprise an animation program created through use of animation program creation module, as described herein.

Object 705, object state 710, 3D model 715, program time input to object state and/or program element map 720, program element 725, sound 735, graphical effect 740, program time input 745, run time input 750, records may be provided with an instance of animation creation module 800, with a set of construction blocks, and the like, so that a party can provide a set construction blocks, a set of "toy" or model vehicles, people or the like, for use in creating animation programs.

The data groups used by modules or routines illustrated in FIG. 7 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 8:
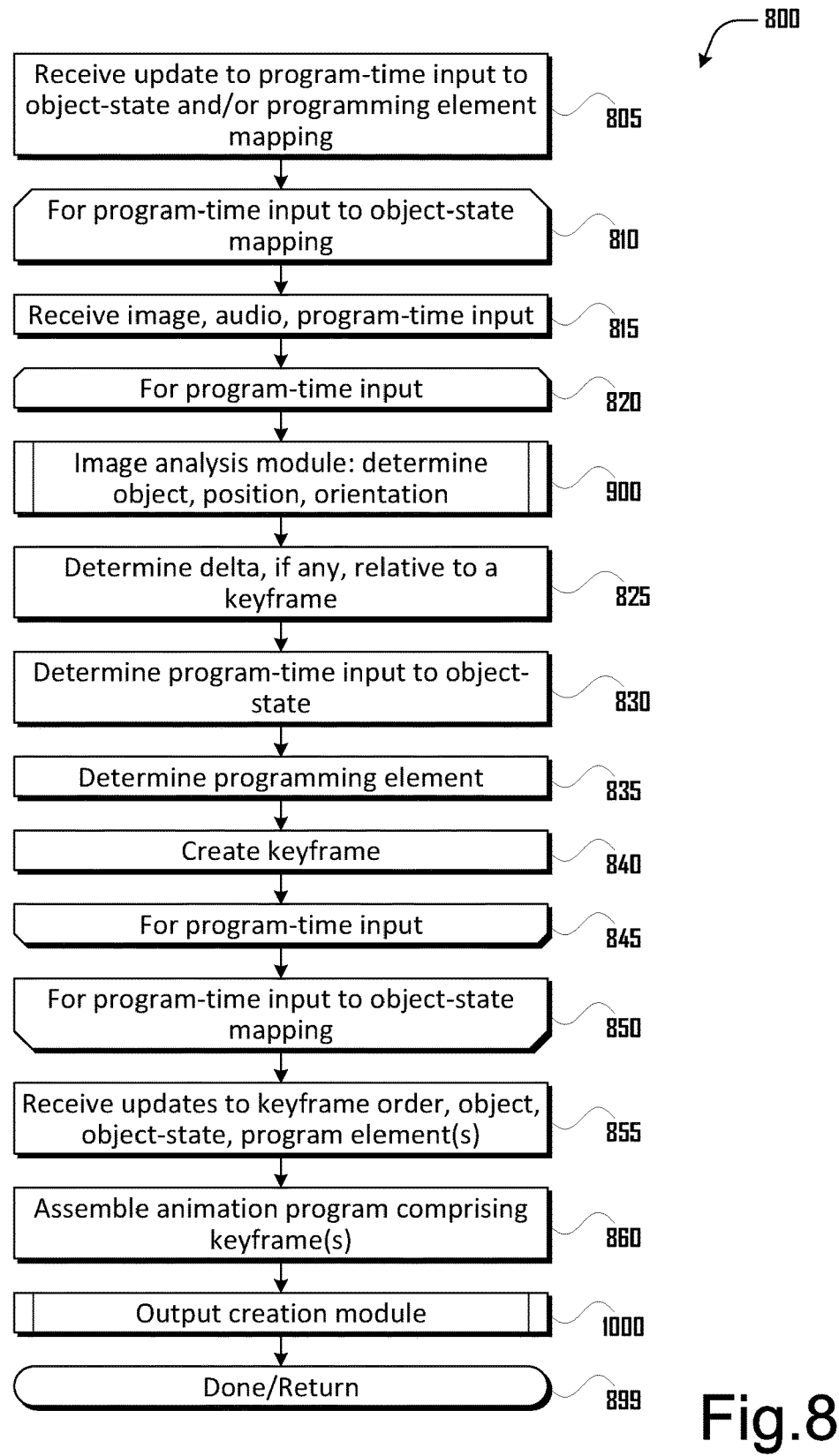
FIG. 8 is a flow diagram illustrating an example of a method and algorithmic structure performed by an animation creation module, according to some embodiments.

FIG. 8 is a flow diagram illustrating an example of a method and/or algorithmic structure performed by animation creation module 800, according to some embodiments. Animation creation module 800 may be executed by, for example, animation device 600.

At block 805, animation creation module 800 may receive an update to program time input to object state and/or program element mapping. Animation creation module 800 may map program time input to an object state and/or to a programming element according to a mapping. By way of example, as discussed and illustrated in relation FIGS. 1-4, inversion of car 105 may be interpreted as object state for an explosion. By way of example, the sequence of images and/or the order of creation of keyframes in relation to FIGS. 1-4 may be interpreted as an instruction for a programming element to create inbetweening images between the keyframes in the order of their creation. Further by way of example, as discussed and illustrated in relation FIGS. 1-4, a whistle may be interpreted as object state for a tire screech, which tire screech should occur in relation to a keyframe and/or in relation to images created in inbetweening images between the keyframe and a previous or subsequent keyframe. Further by way of example, a detected change in position or orientation of an object in two images or more may be mapped to an object state, including an object state primitive, such as a rotation of a number of degrees or a translation of number of pixels or units in a coordinate system. Mapping between program time input and object states and/or programming element may be according to a best fit or closest approximation; for example, a detected yaw rotation of 4 degrees with respect to two images of an object may map to an object state (for the second image) for a yaw rotation of 5 degrees.

The mapping of program time input to object states and programming elements may be updated in block 805. Updates may be received from a user, such as a party using animation creation module 800 to create an animation program, and/or updates may be received from a provider of objects which are used to create an animation program. For example, a set of construction blocks, such as a set of LEGO™ construction blocks, may "come with" or be associated with a mapping of program time input to object states and programming elements, so that the output of an animation program created using this set of construction blocks is recognizable. The mapping may be stored as, for example, one or more program time input to object state and/or program element map 720 records (abbreviated as "pt input to object state and/or program element map" in FIG. 7). A set of program time input to object state and/or program element map 720 records may be selectable by a user of animation creation module 800, which selection may be understood as equivalent to an update.

Opening loop block 810 to closing loop block 850 may iterate for set of selected or updated program time input to object state and/or program element map 720 records, such as during creation of an animation program using a set of such records.

At block 815, animation creation module 800 may receive or obtain access to image, audio, or other program time input. This input may be received from, for example, a camera (including still and video cameras), a microphone, other sources of audio (including keyboard, audio files, etc.), a text input source (including text input from a user of animation creation module 800), data input (including data input from an object being imaged or another device), and other input modalities which may be available to, for example input 645, or which may be accessed by or via network interface 630. Receiving program time input may also involve identification and/or selection of specific portions of program time input, such as a selection of one or a set of images from a video (comprising a larger set of images).

Opening loop block 820 to closing loop block 845 may iterate over program time input received or identified at block 815. Iteration over program time input may be according to chronological sequence or according to a sequence selected or identified by a user of animation creation module 800.

At block 900, animation creation module 800 may perform image analysis on an input image in the then-current program time input. Image analysis may be to determine an object in such image, as well as a position and/or orientation of such object, including rigid body components therein. Objects may be recorded in animation device datastore 700 as one or more object 705 records. Objects may be associated with a 3-dimensional ("3D") model of a physical or virtual structure, including 3D model which includes or is associated with a digital armature. Image analysis may be performed as a subroutine or submodule, such as by a call to image analysis module 900 (discussed further below).

At block 825, animation creation module 800 may determine a delta, change, or difference between a then-current program time input relative to a keyframe. The relative keyframe may be according to a chronological sequence, a logical sequence, or a user-specified keyframe. This determination may be based, for example, on an orientation and/or position of an object or a rigid body within an object determined by image analysis module 900 with respect to the then-current program time input and the relative keyframe. This determination may involve determination of the delta with respect to a digital armature for an object and/or a rigid body within the object. This determination may be relative to another object and/or object state, a frame of an image, a coordinate in a coordinate space, and the like.

At block 830, animation creation module 800 may determine an object state corresponding to the program time input. This may be determined, for example, according to a mapping of program time input to object states, according to user input, or the like. The determination may be based on the delta determined at block 825. Examples of object states may include (without limitation) i) a position and orientation of an object and/or a rigid body within an object, such as according to a digital armature, ii) a sound effect, iii) a graphical effect, and/or iv) a lighting effect. Sound and graphical effects may be drawn from a palette of sound and graphical effects. Sound and graphical effects may also be created and/or recorded at program time, such as a sound recorded when an image was taken. Sound and graphical effects may involve overlaying or replacing a sound or an image with another sound or image or a transformation thereof. Graphical effects may comprise a transparency, a foreground/background layering, a color effect, a graphical output (which may be overlaid on another image) and the like. Sounds and graphical effects may be stored in animation device datastore 700 as one or more sound 735 and graphical effect 740 records.

Object states may be organized as primitives and macros. In this organizational scheme, primitives may generally correspond to units, such as units of rotation or translation, or colors or other object states which may be layered or combined with other object states. In this organizational scheme, macros may comprise multiple primitives in combination. Macros may be created by users and/or may be provided by the provider of animation creation module and/or a third party.

At block 835, animation creation module 800 may determine a programming element to associate with the then-current program time input. A programming element comprises, for example, a command, a conditional command, a function, a loop, a listen for run time user input, and a transition. A command may be, for example, an instruction to proceed to a keyframe, to perform inbetweening relative to an object and/or object state in another keyframe (which may involve interpolation, computer animation, or other generation of a sequence of transitional images between a set of keyframes), to execute a function or process, or the like. A conditional command, for example, may be command which is executed on receipt of a run time user input specified, for example, in run time input 750 record. A function may be, for example, a process or method which acts on data, a data access and/or a data evaluation. A loop may be, for example, a sequence of keyframes, object states, and/or a sequence of programming elements. A listen for run time user input may allow the output of an animation program (whether video, game, or device control) to receive user input; received user input may be processed in a command, conditional command, a function, a loop, and a transition. A transition may be, for example, a fade in or out, a blur, a swipe a dissolve, a merger, a blend, or an instruction to perform inbetweening relative to a keyframe (such as an interpolation of transitional images or generation of computer generated transitional images). The programming element may be determined based on user input. User input may be explicit, such as selection of a programming element from a menu, specification of a programming element via text command in a programming instruction or sequence of programming instructions, or the like. User input may also be implicit and may be used to determine the programming element based on, for example, program time input to object state and/or program element map 720 other user input. For example, receipt of a sequence of images to be created as keyframes may be mapped to programming elements for such keyframes to create transitions between such keyframes.

At block 840, animation creation module 800 may create one or more keyframe 730 record(s) corresponding to the then-current program time input, object, object state, and programming element. Keyframe records may comprise a least one object, at least one object state, and at least one programming element.

At closing loop block 845, animation creation module 800 may return to opening loop block 820 to iterate over the next program time input.

At closing loop block 850, animation creation module 800 may return to opening loop block 810 to iterate over the mapping of programming time input to object states.

At block 855, animation creation module 800 may receive updates to objects, object states, and programming elements in keyframes, including to the sequential or logical keyframe order defined in programming elements. Such updates may come from a user who removes, adds, or changes an object, object state, or set of objects or object states in a keyframe or who re-orders a sequence of keyframes or who changes the logic which determines a logical sequence of keyframes. For example a user may add an object in a specified position to a keyframe or a user may change an object state for an object in a keyframe. For example, a user may update a conditional command to change a response to run time user input, such that instead of going from keyframe-1 to keyframe-2, the logical order proceeds from keyframe-1 to keyframe-3 (with inbetweening to generate transitional images between keyframe-1 and keyframe-3 instead of between keyframe-1 and keyframe-2). For example, a user may add a keyframe to a chronological or logical sequence of keyframes. This block may result in or achieve the effect of re-processing blocks 825 to 835.

At block 860, animation creation module 800 may assemble an animation program comprising a set of keyframes 730, such as the set updated at block 855. Animation programs may be stored in animation device datastore 700 as one or more animation program 770 records.

At block 1000, animation creation module 800 may produce output from an animation program 770, such as a video, an interactive experience or game or a control of a physical device. An example of such output production is illustrated and described as output creation module 1000, illustrated and described further in FIG. 10.

At done block 899, animation creation module 800 may conclude and/or may return to a process which spawned it.

Figure 9:
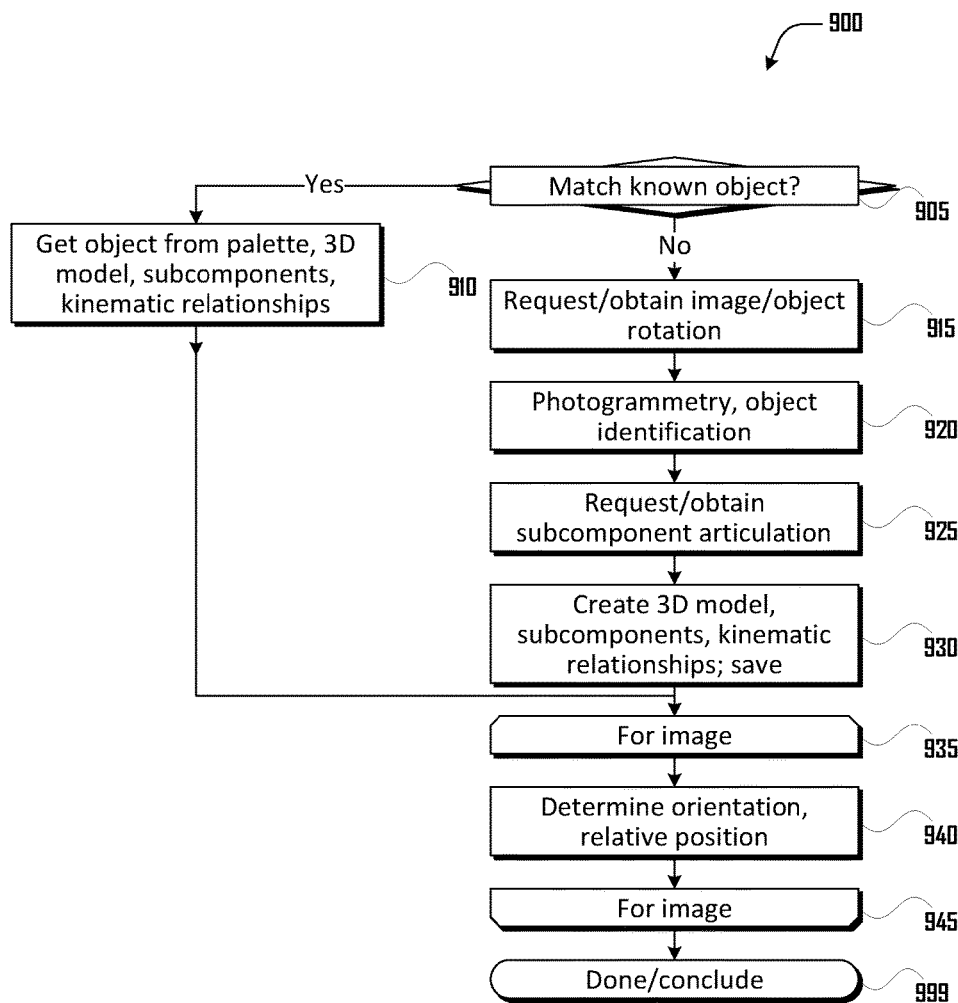
FIG. 9 is a flow diagram illustrating an example of a method and algorithmic structure performed by an image analysis module, according to some embodiments.

FIG. 9 is a flow diagram illustrating an example of a method and/or algorithmic structure performed by image analysis module 900, according to some embodiments. Image analysis module 900 may be executed by, for example, animation device 600. Image analysis module 900 is illustrated as a sub-module of animation creation module 800, though it may be executed independently. Image analysis module 900 may process program time input, such as an image.

At decision block 905, image analysis module 900 may determine whether a then-current image contains or is associated with a known or previously characterized object, such as an object in a palette of objects. This identification may be based on an identifier of the object. Object identifiers may comprise, for example, a visually identifiable structure, such as an assembly of construction blocks, a text-string and/or data identifier which may be visually identifiable via character recognition with respect to the image or which may be transmitted from the real-world object or from a network path associated with a real-world object when the image was recorded.

If affirmative or equivalent at decision block 905, at block 910 image analysis module 900 may obtain records associated with and/or describing the object. These records may be obtained from animation device datastore 700 and/or a remote datastore. These records may comprise one or more object 705 and 3D model 715 records. Object 705 record may comprise an identifier of the object, a name of the object, a developer or source of the object, and the like. 3D model 715 records may comprise a digital armature describing kinematic relationship(s) among rigid bodies in an object.

If negative or equivalent at decision block 905, at block 915, image analysis module 900 may optionally request and/or obtain rotation of the object and images therefrom. This request may result in additional image input, such as additional images from different angles.

At block 920, image analysis module 900 may perform object identification, such as by performing photogrammetry on the image(s).

At block 925, image analysis module 900 may request and/or obtain articulation of rigid bodies or other subcomponents of the object. Additional photogrammetry may be performed with the object in one or more articulated conditions.

At block 930, image analysis module 900 may create a 3D model of the object, including a digital armature for the object. The result may be saved as one or more object 705 and 3D model 715 records in animation device datastore 700.

Opening loop block 935 to closing loop block 945 may iterate over a then-current image, such as an image processed at block 905 (other images collected, such as by blocks 915 and 925 may be ignored).

At block 940, image analysis module 900 may determine an orientation and position of the object, including of rigid bodies within object. The determined orientation and position may be relative to the frame of the image, relative to a coordinate in a coordinate system, and/or relative to another object, including one included in an image for the purpose of providing a relative reference. The orientation and position may be determined by comparing the 3D model and digital armature of the object to the image and determining a best fit; the determination may be aided by outputting to a user the image and a rotated and positioned 3D model and by giving the user the opportunity to rotate and position the 3D model relative to the image according to a digital armature.

At done block 999, image analysis module 900 may conclude and/or return to a process which may have spawned it.

Figure 10:
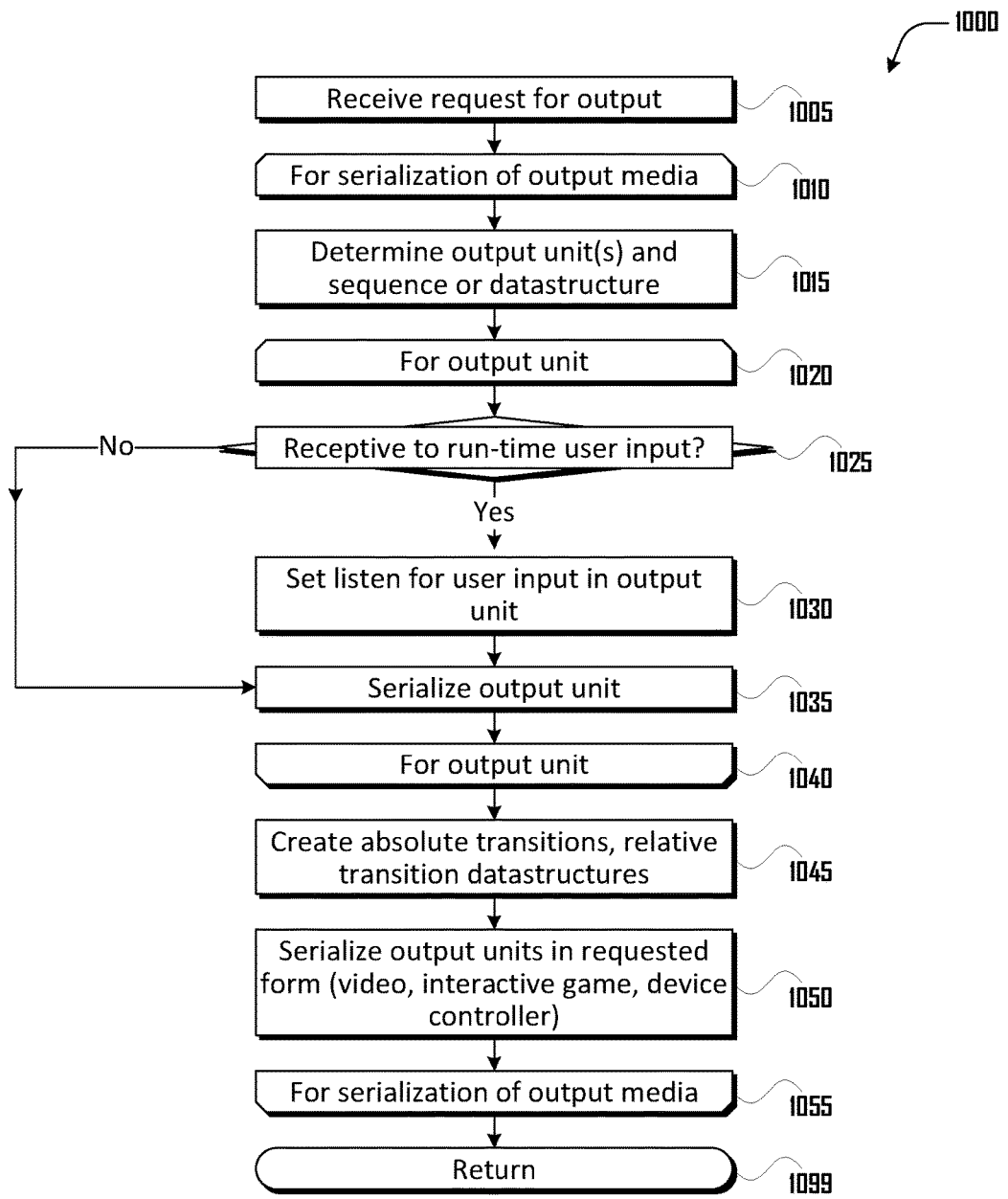
FIG. 10 is a flow diagram illustrating an example of a method and algorithmic structure performed by an output creation module, according to some embodiments.

FIG. 10 is a flow diagram illustrating an example of a method and/or algorithmic structure performed by output creation module 1000, according to some embodiments. Output creation module 1000 may be executed by, for example, animation device 600, whether independently or as a subroutine or submodule.

At block 1005, output creation module 1000 may receive a request for output. The request may specify the type of output, such as a video, an interactive experience or game, or a control of a device (such as radio controlled car 510).

Opening loop block 1010 to closing loop block 1055 may iterate for serialization of requested output formats.

At block 1015, output creation module 1000 may determine the output unit(s) and a sequence or datastructure of such output units. For example, output units for a video may comprise image frames in a chronological sequence generated from keyframes and inbetweening between keyframes, whereas output units for an interactive experience or game may comprise executable code or processes which respond to user or other input to form a logical sequence, which processes generate video output from keyframes and inbetweening between keyframes or which processes generate control commands to be sent to a physical device and an articulated armature therein.

Opening loop block 1020 to closing loop block 1055 may iterate for each output unit of block 1015.

At decision block 1025, output creation module 1000 may determine whether the then-current output unit is receptive to run time user input, such as according to a conditional command. If affirmative or equivalent at decision block 1025, at block 1030 output creation module 1000 may set a listen for user input in the output unit.

At block 1035, output creation module 1000 may serialize the then-current output unit, such as generation of an image from a keyframe, generation of an executable code or processes for responding to user input and generating image frames (such as during an interactive experience or game) and/or generating control commands for an articulated armature (such as for a device controller).

At block 1045, output creation module 1000 may create transitions between output units. Transitions may be absolute, such as a sequence of images produced by inbetweening applied to a keyframe sequence (computer generated or interpolated transitional images between keyframes) to form a video. Transitions may be relative, such as transition datastructures defined according to conditional commands which define how run time user input in an interactive experience or device controller is to be processed and responded to.

At block 1050, output creation module 1000 may serialize output units in the requested form(s), such as in an output video, output game, and/or output device controller. These may be saved as, for example, one or more output video 755, output game 760, and/or output device controller 765 records.

At done block 1099, output creation module 1000 may conclude and/or may return to a process which spawned it.

In this way, an animation author may have animation device 600 machine create an animation program ranging from a relatively simple stop-motion animation to a more complex sequence of keyframes and programming elements which respond to user input. The resulting animation programs may be output as videos, as non-linear interactive experiences, and/or may be used to control electronic actuators in articulated armatures in the construction toys.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

Example 1

An apparatus for machine creation of an animation program for a user, comprising: a computer processor and a memory; and an animation creation module to machine create the animation program, wherein to machine create the animation program, the animation creation module is to receive a first image, perform image analysis on the first image to determine an object in the first image, determine an object state of the object, determine a programming element in relation to the object and the object state, wherein the programming element comprises a transition to a second keyframe, create a first keyframe that includes the object, object state and programming element, and assemble the animation program for the user comprising the first and second keyframes; wherein the object state comprises an object state primitive comprising at least one of a position of the object or an orientation of the object.

Example 2

The apparatus according to Example 1, wherein to perform image analysis on the first image to determine the object in the first image comprises to perform image analysis on the first image to determine the object according to a correspondence with an object identifier in a palette of objects.

Example 3

The apparatus according to Example 2, wherein the object identifier is one of a structure of the object or a character string and wherein the identifier is received in one of the first image or a wireless signal received in conjunction with when the first image was taken.

Example 4

The apparatus according to Example 1, wherein the object is a first object, the object state is a first object state, the programming element is a first programming element, the keyframe is a first keyframe, and the first programming element comprises an instruction to create the transition relative to a second keyframe, wherein the second keyframe includes the first or a second object, a second object state, and a second programming element.

Example 5

The apparatus according to Example 1, wherein the image is a first image and wherein the object state is determined based on at least one of i) a degree of difference or similarity between the first image and a second image or ii) compare the first image to a 3-dimensional model and digital armature of the object to determine the position and the orientation of the object and solid bodies within the object.

Example 6

The apparatus according to Example 1, wherein the object state further comprises an object state macro.

Example 7

The apparatus according to Example 6, wherein the object state macro comprises a set of object state primitives and wherein the object state macro is one of a set of object state macros included in the animation creation module or created by the user of the animation creation module.

Example 8

The apparatus according to Example 1, wherein the object state primitive further comprises at least one of a sound effect, a graphical effect, a lighting effect, or an image.

Example 9

The apparatus according to Example 8, wherein the sound is at least one of a sound in a palette of sounds or a sound recorded in conjunction with recording the first image or wherein the graphical effect is a graphical effect in a palette of graphical effects.

Example 10

The apparatus according to Example 1, wherein the position or orientation is relative to at least one of another object and object state, a frame of the first image, or a coordinate in a coordinate space.

Example 11

The apparatus according to Example 1, wherein the animation creation module is to receive a program time input, and determine the object state or the programming element by mapping the program time input to the object state or the programming element according to a program time input to object state or programming element map.

Example 12

The apparatus according to Example 11, wherein the program time input comprises at least one of the first image, a text input, a speech input, a relative or absolute orientation or position of the object in the first image, or a sequence of images.

Example 13

The apparatus according to Example 1, wherein the programming element further comprises at least one of a command, a conditional command, a function, a loop, and a listen for a run-time user input.

Example 14

The apparatus according to Example 13, wherein the listen for a run-time user input comprises a value of the run-time user input, wherein the value of the run-time user input is a condition for the conditional command.

Example 15

The apparatus according to Example 1, wherein the transition comprises at least one of a fade, a blur, a swipe, a dissolve, a merge, a blend, or an instruction to perform an inbetweening relative to another keyframe.

Example 16

The apparatus according to Example 15, wherein the inbetweening comprises a generation of a transitional image through at least one of a kinematic transformation, an interpolation, or a computer animation.

Example 17

The apparatus according to Example 1, wherein the object comprises a set of solid bodies in a kinematic chain and wherein the transition to the second keyframe comprises determine a set of intermediate images between the first and second keyframes based on the set of solid bodies and the kinematic chain.

Example 18

The apparatus according to Example 1, wherein the first image is in a set of images, wherein the set of images was recorded as at least one of a video or a set of stop-motion images.

Example 19

The apparatus according to Example 1, wherein the animation creation module is to output the animation program in at least one of a video, an interactive game, or a control of an actuator.

Example 20

The apparatus according to Example 19, wherein the actuator is in a physical object corresponding to the object in the first image and the control of the actuator is to implement the object state in the physical object.

Example 21

The apparatus according to Example 19, wherein the animation creation module is to output the animation program as the interactive game or as the control of an actuator by setting a listen for a value of a run-time user input, wherein the value of the run-time user input is a condition for a conditional command of the programming element, and interpolating or generating computer generated transitional images between the first and second keyframes in the sequence of keyframes according to the value of the run-time user input and the conditional command.

Example 22

The apparatus according to Example 19, wherein the animation creation module is to output the video by assembling a sequence of keyframes comprising the first and second keyframes, interpolating or generating computer generated transitional images between the first and second keyframes in the sequence of keyframes according to a set of object states in the set of keyframes, wherein the sequence of keyframes is defined by a set of programming elements in the set of keyframes.

Example 23

A computer implemented method for machine creation of an animation program for a user, comprising: by a computer processor, receiving a first image; by the computer processor, performing image analysis on the first image to determine an object in the first image; by the computer processor, determining an object state of the object; by the computer processor, determining a programming element in relation to the object and the object state, wherein the programming element comprises a transition to a second keyframe; by the computer processor, creating a first keyframe comprising the object, the object state and the programming element; by the computer processor, assembling an animation program comprising the first and second keyframes; wherein the object state comprises at least one of an object state primitive comprising at least one of a position of the object or an orientation of the object.

Example 24

The method according to Example 23, wherein performing image analysis on the first image to determine the object in the first image comprises performing image analysis on the first image to determine the object according to a correspondence with an object identifier in a palette of objects.

Example 25

The method according to Example 24, wherein the object identifier is one of a structure of the object or a character string and wherein the identifier is received in one of the first image or a wireless signal received in conjunction with when the first image was taken.

Example 26

The method according to Example 23, wherein the object is a first object, the object state is a first object state, the programming element is a first programming element, the keyframe is a first keyframe, and the first programming element comprises an instruction to create the transition relative to a second keyframe, wherein the second keyframe includes the first or a second object, a second object state, and a second programming element.

Example 27

The method according to Example 23, wherein the image is a first image and wherein determining the object state comprises at least one of i) determining a degree of difference or similarity between the first image and a second image or ii) or ii) comparing the first image to a 3-dimensional model and digital armature of the object to determine the position and the orientation of the object and solid bodies within the object.

Example 28

The method according to Example 23, wherein the object state further comprises an object state macro.

Example 29

The method according to Example 28, wherein the object state macro comprises a set of object state primitives and wherein the object state macro is one of a palette of object state macros or wherein the object state macro is created by the user.

Example 30

The method according to Example 23, wherein the object state primitive further comprises at least one of a sound effect, a graphical effect, a lighting effect, or an image.

Example 31

The method according to Example 29, wherein the sound is at least one of a sound in a palette of sounds or a sound recorded in conjunction with recording the first image or wherein the graphical effect is a graphical effect in a palette of graphical effects.

Example 32

The method according to Example 23, further comprising determining the position or orientation relative to at least one of another object and object state, a frame of the first image, or a coordinate in a coordinate space.

Example 33

The method according to Example 23, further comprising receiving a program time input and determining the object state or the programming element by mapping the program time input to the object state or the programming element according to a program time input to object state or programming element map.

Example 34

The method according to Example 33, wherein the program time input comprises at least one of the first image, a text input, a speech input, a relative or absolute orientation or position of the object in the first image, or a sequence of images.

Example 35

The method according to Example 23, wherein the programming element further comprises at least one of a command, a conditional command, a function, a loop, and a listen for a run-time user input.

Example 36

The method according to Example 35, wherein the listen for a run-time user input comprises a value of the run-time user input, wherein the value of the run-time user input is a condition for the conditional command.

Example 37

The method according to Example 23, wherein the transition comprises at least one of a fade, a blur, a swipe, a dissolve, a merge, a blend, or an instruction to perform an inbetweening relative to another keyframe.

Example 38

The method according to Example 37, wherein inbetweening comprises generating a transitional image through at least one of a kinematic transformation, an interpolation, or a computer animation.

Example 39

The method according to Example 23, wherein the object comprises a set of solid bodies in a kinematic chain and wherein the transition to the second keyframe comprises determining a set of intermediate images between the first and second keyframes based on the set of solid bodies and the kinematic chain.

Example 40

The method according to Example 23, wherein the first image is in a set of images, wherein the set of images was recorded as at least one of a video or a set of stop-motion images.

Example 41

The method according to Example 23, further comprising outputting the animation program in at least one of a video, an interactive game, or a control of an actuator.

Example 42

The method according to Example 41, wherein the actuator is in a physical object corresponding to the object in the first image and the control of the actuator is to implement the object state in the physical object.

Example 43

The method according to Example 41, further comprising outputting the animation program as the interactive game or as the control of an actuator by setting a listen for a value of a run-time user input, wherein the value of the run-time user input is a condition for a conditional command of the programming element, and interpolating or generating computer generated transitional images between the first and second keyframes in the sequence of keyframes according to the value of the run-time user input and the conditional command.

Example 44

The method according to Example 41, further comprising outputting the video by assembling a sequence of keyframes comprising the first and second keyframes, interpolating or generating computer generated transitional images between the first and second keyframes in the sequence of keyframes according to a set of object states in the set of keyframes, wherein the sequence of keyframes is defined by a set of programming elements in the set of keyframes.

Example 45

An apparatus for machine creation of an animation program for a user, comprising: means to receive a first image; means to perform image analysis on the first image to determine an object in the first image; means to determine an object state of the object; means to determine a programming element in relation to the object and the object state, wherein the programming element comprises a transition to a second keyframe; means to create a first keyframe comprising the object, the object state and the programming element; and means to assemble an animation program for the user comprising the first and second keyframes; wherein the object state comprises an object state primitive comprising at least one of a position of the object or an orientation of the object.

Example 46

The apparatus according to Example 45, wherein the means to perform image analysis on the first image to determine the object in the first image comprises means to perform image analysis on the first image to determine the object according to a correspondence with an object identifier in a palette of objects.

Example 47

The apparatus according to Example 46, wherein the object identifier is one of a structure of the object or a character string and wherein the identifier is received in one of the first image or a wireless signal received in conjunction with when the first image was taken.

Example 48

The apparatus according to Example 45, wherein the object is a first object, the object state is a first object state, the programming element is a first programming element, the keyframe is a first keyframe, and the first programming element comprises an instruction to create the transition relative to a second keyframe, wherein the second keyframe includes the first or a second object, a second object state, and a second programming element.

Example 49

The apparatus according to Example 1, wherein the image is a first image and further comprising means to determine the object state based on at least one of i) a degree of difference or similarity between the first image and a second image or ii) a comparison of the first image to a 3-dimensional model and digital armature of the object to determine the position and the orientation of the object and solid bodies within the object.

Example 50

The apparatus according to Example 45, wherein the object state further comprises an object state macro.

Example 51

The apparatus according to Example 50, wherein the object state macro comprises a set of object state primitives and wherein the object state macro is one of a set of object state macros in a palette of object state macros or is created by the user.

Example 52

The apparatus according to Example 45, wherein the object state primitive further comprises at least one of a sound effect, a graphical effect, a lighting effect, or an image.

Example 53

The apparatus according to Example 52, wherein the sound is at least one of a sound in a palette of sounds or a sound recorded in conjunction with recording the first image or wherein the graphical effect is a graphical effect in a palette of graphical effects.

Example 54

The apparatus according to Example 45, further comprising means to determine the position or orientation relative to at least one of another object and object state, a frame of the first image, or a coordinate in a coordinate space.

Example 55

The apparatus according to Example 45, further comprising means to receive a program time input, and means to determine the object state or the programming element by mapping the program time input to the object state or the programming element according to a program time input to object state or programming element map.

Example 56

The apparatus according to Example 55, wherein the program time input comprises at least one of the first image, a text input, a speech input, a relative or absolute orientation or position of the object in the first image, or a sequence of images.

Example 57

The apparatus according to Example 45, wherein the programming element further comprises at least one of a command, a conditional command, a function, a loop, and a listen for a run-time user input.

Example 58

The apparatus according to Example 57, wherein the listen for a run-time user input comprises a value of the run-time user input, wherein the value of the run-time user input is a condition for the conditional command.

Example 59

The apparatus according to Example 45, wherein the transition comprises at least one of a fade, a blur, a swipe, a dissolve, a merge, a blend, or an instruction to perform an inbetweening relative to another keyframe.

Example 60

The apparatus according to Example 59, means to perform the inbetweening by means to generate a transitional image through at least one of a kinematic transformation, an interpolation, or a computer animation.

Example 61

The apparatus according to Example 45, wherein the object comprises a set of solid bodies in a kinematic chain and wherein the transition to the second keyframe comprises means to determine a set of intermediate images between the first and second keyframes based on the set of solid bodies and the kinematic chain.

Example 62

The apparatus according to Example 45, wherein the first image is in a set of images, wherein the set of images was recorded as at least one of a video or a set of stop-motion images.

Example 63

The apparatus according to Example 45, further comprising means to output the animation program as at least one of a video, an interactive game, or a control of an actuator.

Example 64

The apparatus according to Example 63, wherein the actuator is in a physical object corresponding to the object in the first image and the control of the actuator comprises means to implement the object state in the physical object.

Example 65

The apparatus according to Example 63, further comprising means to output the animation program as the interactive game or as the control of an actuator by setting a listen for a value of a run-time user input, wherein the value of the run-time user input is a condition for a conditional command of the programming element, and wherein the transition comprises means to interpolate or generate computer generated transitional images between the first and second keyframes in the sequence of keyframes according to the value of the run-time user input and the conditional command.

Example 66

The apparatus according to Example 63, further comprising means to output the video with means to assemble a sequence of keyframes comprising the first and second keyframes, means to interpolate or generate computer generated transitional images between the first and second keyframes in the sequence of keyframes according to a set of object states in the set of keyframes, wherein the sequence of keyframes is defined by a set of programming elements in the set of keyframes.

Example 67

One or more computer-readable media comprising instructions that cause a computer device, in response to execution of the instructions by a processor of the computer device, to: by the computer device, receive a first image; by the computer device, perform image analysis on the first image to determine an object in the first image; by the computer device, determine an object state of the object, wherein the programming element comprises a transition to a second keyframe; by the computer device, determine a programming element in relation to the object and the object state; by the computer device, create a first keyframe comprising the object, the object state and the programming element; and by the computer device, assemble an animation program comprising the first and second keyframes; wherein the object state comprises an object state primitive comprising at least one of a position of the object or an orientation of the object.

Example 68

The computer-readable media according to Example 67, wherein perform image analysis on the first image to determine the object in the first image comprises perform image analysis on the first image to determine the object according to a correspondence with an object identifier in a palette of objects.

Example 69

The computer-readable media according to Example 68, wherein the object identifier is one of a structure of the object or a character string and wherein the identifier is received in one of the first image or a wireless signal received in conjunction with when the first image was taken.

Example 70

The computer-readable media according to Example 67, wherein the object is a first object, the object state is a first object state, the programming element is a first programming element, the keyframe is a first keyframe, and the first programming element comprises an instruction to create the transition relative to a second keyframe, wherein the second keyframe includes the first or a second object, a second object state, and a second programming element.

Example 71

The computer-readable media according to Example 67, wherein the image is a first image and wherein the object state is determined based on at least one of i) a degree of difference or similarity between the first image and a second image or ii) compare the first image to a 3-dimensional model and digital armature of the object to determine the position and the orientation of the object and solid bodies within the object.

Example 72

The computer-readable media according to Example 67, wherein the object state further comprises an object state macro.

Example 73

The computer-readable media according to Example 72, wherein the object state macro comprises a set of object state primitives and wherein the object state macro is one of a set of object state macros included in the animation creation module or created by the user of the animation creation module.

Example 74

The computer-readable media according to Example 67, wherein the object state primitive further comprises at least one of a sound effect, a graphical effect, a lighting effect, or an image.

Example 75

The computer readable media according to Example 74, wherein the sound is at least one of a sound in a palette of sounds or a sound recorded in conjunction with recording the first image or wherein the graphical effect is a graphical effect in a palette of graphical effects.

Example 76

The computer-readable media according to Example 67, wherein the position or orientation is relative to at least one of another object and object state, a frame of the first image, or a coordinate in a coordinate space.

Example 77

The computer-readable media according to Example 67, wherein the animation creation module is to receive a program time input, and determine the object state or the programming element by mapping the program time input to the object state or the programming element according to a program time input to object state or programming element map.

Example 78

The computer readable media according to Example 77, wherein the program time input comprises at least one of the first image, a text input, a speech input, a relative or absolute orientation or position of the object in the first image, or a sequence of images.

Example 79

The computer-readable media according to Example 67, wherein the programming element further comprises at least one of a command, a conditional command, a function, a loop, and a listen for a run-time user input.

Example 80

The computer readable media according to Example 79, wherein the listen for a run-time user input comprises a value of the run-time user input, wherein the value of the run-time user input is a condition for the conditional command.

Example 81

The computer-readable media according to Example 67, wherein the transition comprises at least one of a fade, a blur, a swipe, a dissolve, a merge, a blend, or an instruction to perform an inbetweening relative to another keyframe.

Example 82

The computer readable media according to Example 81, wherein the inbetweening comprises a generation of a transitional image through at least one of a kinematic transformation, an interpolation, or a computer animation.

Example 83

The computer-readable media according to Example 67, wherein the object comprises a set of solid bodies in a kinematic chain and wherein the transition to the second keyframe comprises determine a set of intermediate images between the first and second keyframes based on the set of solid bodies and the kinematic chain.

Example 84

The computer-readable media according to Example 67, wherein the first image is in a set of images, wherein the set of images was recorded as at least one of a video or a set of stop-motion images.

Example 85

The computer-readable media according to Example 67, wherein the animation creation module is to output the animation program in at least one of a video, an interactive game, or a control of an actuator.

Example 86

The computer readable media according to Example 85, wherein the actuator is in a physical object corresponding to the object in the first image and the control of the actuator is to implement the object state in the physical object.

Example 87

The computer readable media according to Example 85, wherein to output the animation program as the interactive game or as the control of an actuator is to set a listen for a value of a run-time user input, wherein the value of the run-time user input is a condition for a conditional command of the programming element, and interpolate or generate computer generated transitional images between the first and second keyframes in the sequence of keyframes according to the value of the run-time user input and the conditional command.

Example 88

The computer readable media according to Example 85, wherein to output the video comprises to assemble a sequence of keyframes comprising the first and second keyframes, interpolate or generate computer generated transitional images between the first and second keyframes in the sequence of keyframes according to a set of object states in the set of keyframes, wherein the sequence of keyframes is defined by a set of programming elements in the set of keyframes.

The invention claimed is:

1. An apparatus for machine creation of an animation program for a user, comprising:
a computer processor and a memory; and
an animation creation module to machine create the animation program, wherein to machine create the animation program, the animation creation module is to receive an image, perform image analysis on the image to determine an object in the image, determine an object state of the object, determine a programming element in relation to the object and the object state, wherein the programming element comprises a transition to a second keyframe, create a first keyframe that includes the object, object state and programming element, and assemble the animation program for the user comprising the first and second keyframes; wherein the object state comprises an object state primitive comprising at least one of a position of the object or an orientation of the object.

2. The apparatus according to claim 1, wherein the object is a first object, the object state is a first object state, the programming element is a first programming element, and the first programming element comprises an instruction to create the transition relative to a second keyframe, wherein the second keyframe includes the first or a second object, a second object state, and a second programming element.

3. The apparatus according to claim 1, wherein the image is a first image and wherein the object state is determined based on at least one of i) a degree of difference or similarity between the first image and a second image or ii) comparing the first image to a 3-dimensional model and digital armature of the object to determine the position and the orientation of the object and solid bodies within the object.

4. The apparatus according to claim 1, wherein the object state further comprises an object state macro, wherein the object state macro comprises a set of object state primitives and wherein the object state macro is one of a set of object state macros included in the animation creation module or created by the user of the animation creation module, wherein the object state primitive further comprises at least one of a sound effect, a graphical effect, and a lighting effect, wherein the sound effect is at least one of a sound effect in a palette of sound effects or a sound recorded in conjunction with recording the image or wherein the graphical effect is a graphical effect in a palette of graphical effects.

5. The apparatus according to claim 1, wherein the animation creation module is to receive a program time input, and determine the object state or the programming element by mapping the program time input to the object state or the programming element according to a program time input to object state or programming element map, wherein the program time input comprises at least one of the image, a text input, a speech input, a relative or absolute orientation or position of the object in the image, or a sequence of images.

6. The apparatus according to claim 1, wherein the programming element further comprises at least one of a command, a conditional command, a function, a loop, and a listen for a run-time user input, wherein the listen for the run-time user input comprises a value of the run-time user input, wherein the value of the run-time user input is a condition for the conditional command, and wherein the transition comprises at least one of a fade, a blur, a swipe, a dissolve, a merge, a blend, or an instruction to perform an inbetweening relative to another keyframe, and wherein the inbetweening comprises a generation of a transitional image through at least one of a kinematic transformation, an interpolation, or a computer animation.

7. The apparatus according to claim 1, wherein the animation creation module is to output the animation program in at least one of a video, an interactive game, or a control of an actuator and wherein at least one of i) wherein the actuator is in a physical object corresponding to the object in the image and the control of the actuator is to implement the object state in the physical object; ii) wherein the animation creation module is to output the animation program as the interactive game or as the control of the actuator by setting a listen for a value of a run-time user input, wherein the value of the run-time user input is a condition for a conditional command of the programming element, and interpolating or generating computer generated transitional images between the first and second keyframes in a sequence of keyframes according to the value of the run-time user input and the conditional command; or iii) wherein the animation creation module is to output the video by assembling the sequence of keyframes comprising the first and second keyframes, interpolating or generating the computer generated transitional images between the first and second keyframes in the sequence of keyframes according to a set of object states in a set of keyframes, wherein the sequence of keyframes is defined by a set of programming elements in the set of keyframes.

8. A computer implemented method for machine creation of an animation program for a user, comprising:
by a computer processor, receiving an image;
by the computer processor, performing image analysis on the image to determine an object in the image;
by the computer processor, determining an object state of the object;
by the computer processor, determining a programming element in relation to the object and the object state, wherein the programming element comprises a transition to a second keyframe;
by the computer processor, creating a first keyframe comprising the object, the object state and the programming element;
by the computer processor, assembling an animation program comprising the first and second keyframes;
wherein the object state comprises at least one of an object state primitive comprising at least one of a position of the object or an orientation of the object.

9. The method according to claim 8, wherein the object is a first object, the object state is a first object state, the programming element is a first programming element, and the first programming element comprises an instruction to create the transition relative to a second keyframe, wherein the second keyframe includes the first or a second object, a second object state, and a second programming element.

10. The method according to claim 8, wherein the image is a first image and wherein determining the object state comprises at least one of i) determining a degree of difference or similarity between the first image and a second image or ii) comparing the first image to a 3-dimensional model and digital armature of the object and determining the position and the orientation of the object and solid bodies within the object.

11. The method according to claim 8, further comprising receiving a program time input and determining the object state or the programming element by mapping the program time input to the object state or the programming element according to a program time input to object state or programming element map, wherein the program time input comprises at least one of the image, a text input, a speech input, a relative or absolute orientation or position of the object in the image, or a sequence of images.

12. The method according to claim 8, wherein the programming element further comprises at least one of a command, a conditional command, a function, a loop, and a listen for a run-time user input, wherein the listen for the run-time user input comprises a value of the run-time user input, wherein the value of the run-time user input is a condition for the conditional command, wherein the transition comprises at least one of a fade, a blur, a swipe, a dissolve, a merge, a blend, or an instruction to perform an inbetweening relative to another keyframe, wherein the inbetweening comprises generating a transitional image through at least one of a kinematic transformation, an interpolation, or a computer animation.

13. The method according to claim 8, further comprising outputting the animation program in at least one of a video, an interactive game, or a control of an actuator, wherein at least one of wherein i) the actuator is in a physical object corresponding to the object in the image and the control of the actuator is to implement the object state in the physical object; ii) outputting the animation program as the interactive game or as the control of the actuator by setting a listen for a value of a run-time user input, wherein the value of the run-time user input is a condition for a conditional command of the programming element, and interpolating or generating computer generated transitional images between the first and second keyframes in a sequence of keyframes according to the value of the run-time user input and the conditional command; or iii) outputting the video by assembling the sequence of keyframes comprising the first and second keyframes, interpolating or generating the computer generated transitional images between the first and second keyframes in a sequence of keyframes according to a set of object states in a set of keyframes, wherein the sequence of keyframes is defined by a set of programming elements in the set of keyframes.

14. An apparatus for machine creation of an animation program for a user, comprising:
   means to receive an image;
   means to perform image analysis on the image to determine an object in the image;
   means to determine an object state of the object;
   means to determine a programming element in relation to the object and the object state, wherein the programming element comprises a transition to a second keyframe;
   means to create a first keyframe comprising the object, the object state and the programming element; and
   means to assemble an animation program for the user comprising the first and second keyframes; wherein the object state comprises an object state primitive comprising at least one of a position of the object or an orientation of the object.

15. The apparatus according to claim 14, wherein the object is a first object, the object state is a first object state, the programming element is a first programming element, and the first programming element comprises an instruction to create the transition relative to a second keyframe, wherein the second keyframe includes the first or a second object, a second object state, and a second programming element.

16. The apparatus according to claim 14, wherein the image is a first image and further comprising means to determine the object state based on at least one of i) a degree of difference or similarity between the first image and a second image or ii) comparing the first image to a 3-dimensional model and digital armature of the object to determine the position and the orientation of the object and solid bodies within the object.

17. The apparatus according to claim 14, further comprising means to receive a program time input, and means to determine the object state or the programming element by mapping the program time input to the object state or the programming element according to a program time input to object state or programming element map, wherein the program time input comprises at least one of the image, a text input, a speech input, a relative or absolute orientation or position of the object in the image, or a sequence of images.

18. The apparatus according to claim 14, wherein the programming element further comprises at least one of a command, a conditional command, a function, a loop, and a listen for a run-time user input, wherein the listen for the run-time user input comprises a value of the run-time user input, wherein the value of the run-time user input is a condition for the conditional command, and wherein the transition comprises at least one of a fade, a blur, a swipe, a dissolve, a merge, a blend, or an instruction to perform an inbetweening relative to another keyframe, and wherein the inbetweening comprises means to generate a transitional image through at least one of a kinematic transformation, an interpolation, or a computer animation.

19. The apparatus according to claim 14, further comprising means to output the animation program as at least one of a video, an interactive game, or a control of an actuator and wherein at least one of i) wherein the actuator is in a physical object corresponding to the object in the image and the control of the actuator comprises means to implement the object state in the physical object; ii) further comprising means to output the animation program as the interactive game or as the control of the actuator by setting a listen for a value of a run-time user input, wherein the value of the run-time user input is a condition for a conditional command of the programming element, and wherein the transition comprises means to interpolate or generate computer generated transitional images between the first and second keyframes in a sequence of keyframes according to the value of the run-time user input and the conditional command; or iii) further comprising means to output the video with means to assemble the sequence of keyframes comprising the first and second keyframes, means to interpolate or generate the computer generated transitional images between the first and second keyframes in the sequence of keyframes according to a set of object states in a set of keyframes, wherein the sequence of keyframes is defined by a set of programming elements in the set of keyframes.

20. One or more non-transitory computer-readable media comprising instructions that cause a computer device, in response to execution of the instructions by a processor of the computer device, to:
   by the computer device, receive an image;
   by the computer device, perform image analysis on the image to determine an object in the image;
   by the computer device, determine an object state of the object, wherein a programming element comprises a transition to a second keyframe;

by the computer device, determine the programming element in relation to the object and the object state;

by the computer device, create a first keyframe comprising the object, the object state and the programming element; and by the computer device, assemble an animation program comprising the first and second keyframes;

wherein the object state comprises an object state primitive comprising at least one of a position of the object or an orientation of the object.

21. The non-transitory computer-readable media according to claim 20, wherein the object is a first object, the object state is a first object state, the programming element is a first programming element, and the first programming element comprises an instruction to create the transition relative to a second keyframe, wherein the second keyframe includes the first or a second object, a second object state, and a second programming element.

22. The non-transitory computer-readable media according to claim 20, wherein the image is a first image and wherein the object state is determined based on at least one of i) a degree of difference or similarity between the first image and a second image or ii) comparing the first image to a 3-dimensional model and digital armature of the object to determine the position and the orientation of the object and solid bodies within the object.

23. The non-transitory computer-readable media according to claim 20, wherein the computer device is to receive a program time input, and determine the object state or the programming element by mapping the program time input to the object state or the programming element according to a program time input to object state or programming element map, wherein the program time input comprises at least one of the image, a text input, a speech input, a relative or absolute orientation or position of the object in the image, or a sequence of images.

24. The non-transitory computer-readable media according to claim 20, wherein the programming element further comprises at least one of a command, a conditional command, a function, a loop, and a listen for a run-time user input, wherein the listen for the run-time user input comprises a value of the run-time user input, wherein the value of the run-time user input is a condition for the conditional command wherein the listen for the run-time user input comprises a value of the run-time user input, wherein the value of the run-time user input is a condition for the conditional command, wherein the transition comprises at least one of a fade, a blur, a swipe, a dissolve, a merge, a blend, or an instruction to perform an inbetweening relative to another keyframe, and wherein the inbetweening comprises a generation of a transitional image through at least one of a kinematic transformation, an interpolation, or a computer animation.

25. The non-transitory computer-readable media according to claim 20, wherein an animation creation module is to output the animation program in at least one of a video, an interactive game, or a control of an actuator and wherein at least one of i) wherein the actuator is in a physical object corresponding to the object in the image and the control of the actuator is to implement the object state in the physical object; ii) wherein to output the animation program as the interactive game or as the control of the actuator is to set a listen for a value of a run-time user input, wherein the value of the run-time user input is a condition for a conditional command of the programming element, and interpolate or generate computer generated transitional images between the first and second keyframes in a sequence of keyframes according to the value of the run-time user input and the conditional command; or iii) wherein to output the video comprises to assemble the sequence of keyframes comprising the first and second keyframes, interpolate or generate the computer generated transitional images between the first and second keyframes in the sequence of keyframes according to a set of object states in a set of keyframes, wherein the sequence of keyframes is defined by a set of programming elements in the set of keyframes.

* * * * *